United States Patent
Choh et al.

(10) Patent No.: US 9,503,405 B2
(45) Date of Patent: Nov. 22, 2016

(54) INFORMATION PROCESSING SYSTEM AND METHOD THAT RECORD RESULT OF PROCESS THAT USES E-MAIL TRANSMISSION

(71) Applicants: Tohtetsu Choh, Kanagawa (JP); Kohsuke Namihira, Tokyo (JP)

(72) Inventors: Tohtetsu Choh, Kanagawa (JP); Kohsuke Namihira, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 131 days.

(21) Appl. No.: 14/504,676

(22) Filed: Oct. 2, 2014

(65) Prior Publication Data

US 2015/0106665 A1    Apr. 16, 2015

(30) Foreign Application Priority Data

Oct. 15, 2013   (JP) .................................. 2013-214663
Oct. 15, 2013   (JP) .................................. 2013-214980

(51) Int. Cl.
*G06F 11/07*    (2006.01)
*H04L 12/58*    (2006.01)
*G06Q 10/10*    (2012.01)

(52) U.S. Cl.
CPC ........... *H04L 51/08* (2013.01); *G06F 11/0733* (2013.01); *G06F 11/0784* (2013.01); *H04L 51/30* (2013.01); *G06Q 10/107* (2013.01)

(58) Field of Classification Search
CPC ............ H04L 51/30; H04L 51/00; H04L 5/03; H04L 12/58; G06Q 10/107
See application file for complete search history.

(56) References Cited

U.S. PATENT DOCUMENTS

| 7,676,512 B2 | 3/2010 | Yamamoto et al. |
| 7,904,811 B2 | 3/2011 | Saito |
| 2002/0019848 A1* | 2/2002 | Sugawara ........... H04L 12/5875 709/206 |

(Continued)

FOREIGN PATENT DOCUMENTS

| JP | 2006-081081 | 3/2006 |
| JP | 2006-164110 | 6/2006 |

(Continued)

*Primary Examiner* — Joseph Schell

(74) *Attorney, Agent, or Firm* — IPUSA, PLLC

(57) ABSTRACT

An information processing system, which includes an electronic apparatus and a service providing system executing a process using e-mail based on a request from the electronic apparatus, includes a process reception part that receives the request, a mail transmission part that transmits the e-mail to which identification information uniquely identifying the request is added and in which the address of the service providing system is set as the return destination of the e-mail, a monitoring part that detects reception of the e-mail returned in response to the failure of the transmission of the e-mail, and identifies the request based on the identification information added to the returned e-mail, and a reporting part that reports the failure as the process result of the request to the process reception part. The process reception part records the failure as the process result of the request in response to the reported failure.

5 Claims, 24 Drawing Sheets

(56) References Cited

U.S. PATENT DOCUMENTS

| | | | | |
|---|---|---|---|---|
| 2003/0109271 A1* | 6/2003 | Lewis | ............... | H04L 29/06 |
| | | | | 455/517 |
| 2004/0039843 A1* | 2/2004 | Fuisz | ............... | G06Q 10/107 |
| | | | | 709/245 |
| 2007/0214219 A1* | 9/2007 | Chen | ............... | H04L 12/5875 |
| | | | | 709/206 |
| 2008/0235336 A1* | 9/2008 | Stern | ............... | G06Q 10/107 |
| | | | | 709/206 |
| 2009/0254748 A1* | 10/2009 | Mochizuki | ............... | H04L 51/30 |
| | | | | 713/168 |
| 2013/0198211 A1 | 8/2013 | Kohkaki et al. | | |
| 2013/0227430 A1* | 8/2013 | Kang | ............... | H04L 51/30 |
| | | | | 715/752 |

FOREIGN PATENT DOCUMENTS

| | | |
|---|---|---|
| JP | 2006-339922 | 12/2006 |
| JP | 2009-075689 | 4/2009 |
| JP | 2013-178748 | 9/2013 |

* cited by examiner

FIG.5

| JOB LOG ID | DATE OF CREATION | CONVERSION JOB ID | COMPANY ID | APPARATUS ID | EXECUTION USER | PROJECT ID | IMAGE ID |
|---|---|---|---|---|---|---|---|
| 1 | 2013/7/18 9:00 | 1 | 1 | 1 | Tom | 100 | ndlfh |
| 2 | 2013/7/18 10:00 | 2 | 1 | 1 | John | 200 | jklsa |
| 3 | 2013/7/18 11:00 | 3 | 1 | 3 | Tom | 100 | kuifn |
| 4 | 2013/7/19 11:00 | — | 1 | 2 | David | 700 | nosad |
| 5 | 2013/7/20 9:00 | 4 | 2 | 4 | Robert | 800 | jskcu |

| TRANSMISSION DESTINATION | TRANSMISSION SOURCE ADDRESS | RETURN ADDRESS | TRANSMISSION DESTINATION ADDRESS | FILE FORMAT | ERROR REPORT DESTINATION | STATUS |
|---|---|---|---|---|---|---|
| E-MAIL | info@start.OOO.com | info@start.OOO.com | <me> | PDF WITH TEXT | <me> | SUCCESS |
| E-MAIL | john@test.OOO.co.jp | info@start.OOO.com | a@test.OOO.co.jp | PDF WITH TEXT | <me> | SUCCESS |
| E-MAIL | info@start.OOO.com | info@start.OOO.com | <me> | PDF WITH TEXT | <me> | ERROR |
| SMB | — | — | — | JPEG | — | SUCCESS |
| E-MAIL | info@start.OOO.com | info@start.OOO.com | <me> | JPEG | <me> | IN PROGRESS |

FIG.6A

| PROFILE ID | NAME | COMPANY ID |
|---|---|---|
| 1 | PROFILE A | 1 |
| 2 | PROFILE B | 1 |
| 3 | A PROFILE | 2 |

FIG.6B

| GROUP ID | NAME | PROFILE | ORDER |
|---|---|---|---|
| 10 | GROUP A | 1 | 1 |
| 20 | GROUP B | 1 | 2 |
| 30 | GROUP 1 | 2 | 1 |
| 40 | GROUP C | 1 | 3 |
| 50 | A GROUP | 3 | 1 |

FIG.6C

| PROJECT ID | NAME | GROUP | TRANSMISSION DESTINATION | TRANSMISSION DESTINATION ADDRESS | FILE FORMAT | ERROR REPORT DESTINATION |
|---|---|---|---|---|---|---|
| 100 | ScanToMe | 10 | E-MAIL | \<me\> | PDF WITH TEXT | \<me\> |
| 200 | SendToA | 10 | E-MAIL | a@test.co.jp | PDF WITH TEXT | \<me\> |
| 300 | SendToB | 10 | E-MAIL | b@test.co.jp | PDF WITH TEXT | \<me\> |
| 400 | ScanToMe | 20 | E-MAIL | \<me\> | PDF WITH TEXT | \<me\> |
| 500 | ScanToMe | 40 | E-MAIL | \<me\> | PDF WITH TEXT | \<me\> |
| 600 | ScanToMe | 30 | E-MAIL | \<me\> | JPEG | \<me\> |
| 700 | Local Server | 30 | SMB | — | — | \<me\> |
| 800 | ScanToMe | 50 | E-MAIL | \<me\> | JPEG | \<me\>,admin@test.co.jp |

FIG.6D

| PROJECT ID | APPARATUS ID |
|---|---|
| 1 | 1 |
| 2 | 2 |
| 1 | 3 |
| 3 | 4 |

FIG.7A

| COMPANY ID | COMPANY NAME |
|---|---|
| 1 | A CO., LTD. |
| 2 | B CO., LTD. |
| 3 | C CO., LTD. |

FIG.7B

| USER ID | COMPANY ID | NAME | E-MAIL ADDRESS | AUTHENTICATION TOKEN |
|---|---|---|---|---|
| 1 | 1 | Tom | tom@test.co.jp | jaushcbd |
| 2 | 1 | John | john@test.co.jp | okpd84hd |
| 3 | 1 | David | david@test.co.jp | 73hcgd81 |
| 4 | 2 | Robert | robert@b.foo.com | jskithcf |
| 5 | 3 | James | james@c.hoge.com | akip06sh |

FIG.7C

| APPARATUS ID | COMPANY ID | BODY NUMBER |
|---|---|---|
| 1 | 1 | 1234-5678 |
| 2 | 1 | 1111-2222 |
| 3 | 1 | 9876-5432 |
| 4 | 2 | abcd-efgh |

FIG.8

| CONVERSION JOB ID | DATE OF CREATION | COMPANY ID | EXECUTION USER | FILE URI | IMAGE ID | TRANSMISSION DESTINATION | TRANSMISSION SOURCE ADDRESS |
|---|---|---|---|---|---|---|---|
| 1 | 2013/7/18 9:00 | 1 | Tom | ndlfh | ndlfh | E-MAIL | info@start.◯◯◯.com |
| 2 | 2013/7/18 10:00 | 1 | John | jklsa | jklsa | E-MAIL | john@test.◯◯◯.co.jp |
| 3 | 2013/7/18 11:00 | 1 | Tom | kuifn | kuifn | E-MAIL | info@start.◯◯◯.com |
| 4 | 2013/7/20 9:00 | 2 | Robert | jskcu | jskcu | E-MAIL | info@start.◯◯◯.com |

| TRANSMISSION DESTINATION ADDRESS | RETURN ADDRESS | Message-ID | FILE FORMAT | STATUS |
|---|---|---|---|---|
| tom@test.co.jp | info@start.◯◯◯.com | ndisadoans@start.◯◯◯.co.jp | PDF WITH TEXT | SUCCESS |
| a@test.co.jp | info@start.◯◯◯.com | hsdfladuao@start.◯◯◯.co.jp | PDF WITH TEXT | SUCCESS |
| tom@test.co.jp | info@start.◯◯◯.com | bjskahduah@start.◯◯◯.co.jp | PDF WITH TEXT | ERROR |
| <me> | info@start.◯◯◯.com | msdhaoseu@start.◯◯◯.co.jp | JPEG | IN PROGRESS |

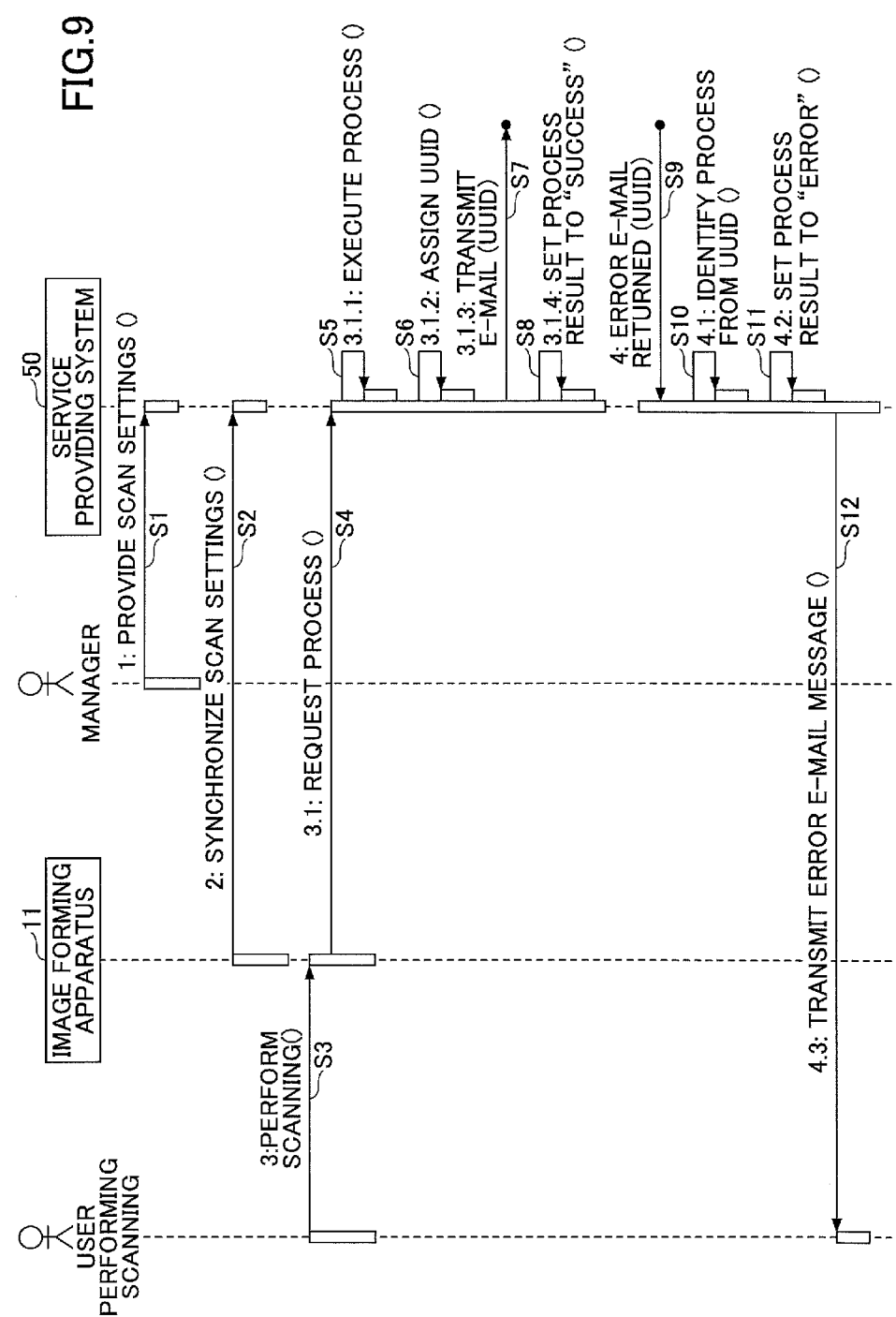

FIG.11

PROFILE SETTING

NAME: PROFILE A

USER AUTHENTICATION  ●YES  ○NO

[ OK ]  [ CANCEL ]

FIG.12

GROUP SETTING

NAME: GROUP A

[ OK ]  [ CANCEL ]

FIG.13

PROJECT SETTING
NAME: ScanToMe
GROUP: GROUP A ▼

DELIVERY DESTINATION:
○SMB  ○FTP  ○EXTERNAL STORAGE  ●E-MAIL

FROM: a@test.co.jp
TO:
☑SEND TO SCANNING PERFORMER

ERROR REPORT E-MAIL:
●YES  ○NO

☑SCANNING PERFORMER  ☐SPECIFY ADDRESS
E-MAIL ADDRESS

FILE FORMAT:
TIFF(MMR. MULTIPAGE) ▼
TIFF(MMR. MULTIPAGE)
PDF WITH TEXT
APPLICATION A
APPLICATION B

OK  CANCEL

FIG.14

| PROFILE ASSIGNMENT | | |
|---|---|---|
| APPARATUS ID: | PROFILE NAME: | |
| 1234-5678 | PROFILE A | ▼ |
| 1111-2222 | PROFILE B | ▼ |
| 9876-5432 | PROFILE A | ▼ |

OK  CANCEL

FIG.20

JOB LOG CHECK

| DATE OF CREATION: | APPARATUS ID: | USERNAME: | PROJECT NAME: | STATUS: |
|---|---|---|---|---|
| 2013/7/18 9:00:00 | 1234-5678 | Tom | ScanToMe | SUCCESS |
| 2013/7/18 10:00:00 | 1234-5678 | John | SendToA | SUCCESS |
| 2013/7/18 11:00:00 | 9876-5432 | Tom | ScanToMe | ERROR |
| 2013/7/19 11:00:00 | 1111-2222 | David | Local Server | SUCCESS |

OK　　CANCEL

FIG.21

| JOB LOG CHECK | | | | | |
|---|---|---|---|---|---|
| DATE OF CREATION: | APPARATUS ID: | USERNAME: | PROJECT NAME: | STATUS: | DETAILS: |
| 2013/7/18 9:00:00 | 1234-5678 | Tom | ScanToMe | INTERNAL ERROR | SERVER DOWN |
| 2013/7/18 10:00:00 | 1234-5678 | John | SendToA | SUCCESS | – |
| 2013/7/18 11:00:00 | 9876-5432 | Tom | ScanToMe | EXTERNAL ERROR | ERROR E-MAIL |
| 2013/7/19 11:00:00 | 1111-2222 | David | Local Server | SUCCESS | – |

OK   CANCEL

FIG.22

```
{
  "app_id":"application1",
  "user_id":"user1",
  "organization_id":"organization1",
  "tasks": [
    {
      "type":"ocr",
      "params": {
                  "files": ["http://example/storage/test.tiff1"],
                  "output_type": "doc",
                  "language": "English", }
    },
    {
      "type":"mail_sender",
      "params":{
              "files": [{"file": "$1.file", "filename": "test1.doc"},
                       {"file": "http://example.co.jp/test2.tif",
                        " filename": "test3.tif"}],
              "to": ["edge@test.com", "staging@test.com"],
              "from": "xyz@test.com",
              "cc": ["edge@test.com", "staging@test.com"],
              "bcc": ["edge@test.com", "staging@test.com"],
              "subject": "This is a subject.",
              "body": "This is a body.",
              "charset": "utf-8"
              }
    }
  ]
}
```

FIG.23

```
"tasks": [
  {
    "type":"ocr",
    "params":{
              "files": ["http://example/storage/test.tif"],
              "output_type": "doc",
              "language": "English",
          }
  },
  {
    "type":"mail_sender",
    "params":{
              "files": [["file": "$1.file", "filename": "test1.doc"],
                  {"file": "http://example.co.jp/test2.tif",
                      "filename": "test3.tif"}],
              "to": ["edge@test.com", "staging@test.com"],
              "from": "xyz@test.com",
              "cc": ["edge@test.com", "staging@test.com"],
              "bcc": ["edge@test.com", "staging@test.com"],
              "subject": "This is a subject.",
              "body": "This is a body.",
              "charset": "utf-8"
              }
  }
]
```

FIG.24

```
"params": {
    "files": [["file": "$1.file", "filename": "test1.doc"],
            ["file": "http://example.co.jp/test2.tif",
            "filename": "test3.tif"]],
    "to": ["edge@test.com", "staging@test.com"],
    "from": "xyz@test.com",
    "cc": ["edge@test.com", "staging@test.com"],
    "bcc": ["edge@test.com", "staging@test.com"],
    "subject": "This is a subject.",
    "body": "This is a body.",
    "charset": "utf-8"
}
```

FIG.25

```
Date: Tue, 13 Aug 2013 14:29:24 +0900
From: xyz@test.com
To: edge@test.com,
    staging@test.com
Cc: edge@test.com,
    staging@test.com OA
Message-ID: <5209c434bd6ae_70a042f78186496e@example.mail>
Subject: This is a subject
Mime-Version: 1.0
Content-Type: multipart/mixed;
  boundary="--==_mimepart_5209c434af0b8_70a042f7818647d4";
  charset=utf-8
OAContent-Transfer-Encoding: 7bit ----==_mimepart_5209c434af0b8_70a042f7818647d4
Date: Tue, 13 Aug 2013 14:29:24 +0900
Mime-Version: 1.0
Content-Type: text/plain;
  charset=utf-8
Content-Transfer-Encoding: 7bit
Content-ID: <5209c434b1570_70a042f7818648df@yasuharu.mail>

This is a body.

----==_mimepart_5209c434af0b8_70a042f7818647d4
Date: Tue, 13 Aug 2013 14:29:24 +0900
 Mime-Version: 1.0
 Content-Type: application/msword;
  charset=UTF-8;
  filename=test1.doc
 Content-Transfer-Encoding: base64
 Content-Disposition: attachment;
  filename=test1.doc
 Content-ID: <5209c434a3e2f_70a042f781864570@example.mail>

ATTACHMENT FILE DATA

----==_mimepart_5209c434af0b8_70a042f7818647d4
Date: Tue, 13 Aug 2013 14:29:24 +0900
Mime-Version: 1.0
Content-Type: image/tiff;
 charset=UTF-8;
 filename=test3.tif
Content-Transfer-Encoding: base64
Content-Disposition: attachment;
 filename=test3.tif
Content-ID: <5209c434a594a_70a042f78186469d@example.mail>

ATTACHMENT FILE DATA

----==_mimepart_5209c434af0b8_70a042f7818647d4--
```

INFORMATION PROCESSING SYSTEM AND METHOD THAT RECORD RESULT OF PROCESS THAT USES E-MAIL TRANSMISSION

CROSS-REFERENCE TO RELATED APPLICATIONS

The present application is based upon and claims the benefit of priority of Japanese Patent Applications No. 2013-214663 and No. 2013-214980, both filed on Oct. 15, 2013, the entire contents of which are incorporated herein by reference.

BACKGROUND OF THE INVENTION

1. Field of the Invention

The present invention relates to information processing systems, service providing systems, and process result recording methods.

2. Description of the Related Art

Image forming apparatuses have been known that have an electronic mail (e-mail) transmitting function to transmit image data from a scanner as an attachment of e-mail (as a file attached to e-mail). When an e-mail message indicating that transmitted e-mail is undeliverable (an "undeliverable" error message) is returned from a mail server, such image forming apparatuses transfer the "undeliverable" error message to the address of a transmitter of the e-mail. (See, for example, Japanese Laid-Open Patent Application No. 2006-164110.)

SUMMARY OF THE INVENTION

According to an aspect of the present invention, an information processing system, which includes an electronic apparatus and a service providing system executing a process using electronic mail based on a request from the electronic apparatus, includes a process reception part configured to receive the request from the electronic apparatus, a mail transmission part configured to add identification information uniquely identifying the request from the electronic apparatus to the electronic mail, set an address of the service providing system as a return destination of the electronic mail to which the identification information is added, and transmit the electronic mail in which the address is set, a monitoring part configured to detect reception of the electronic mail returned in response to failure of the transmission of the electronic mail, and to identify the request from the electronic apparatus based on the identification information added to the returned electronic mail, and a reporting part configured to report the failure as a process result of the request to the process reception part. The process reception part is configured to record the failure as the process result of the request in response to the reported failure.

According to an aspect of the present invention, a service providing system executing a process using electronic mail based on a request from an electronic apparatus includes a process reception part configured to receive the request from the electronic apparatus, a mail transmission part configured to add identification information uniquely identifying the request from the electronic apparatus to the electronic mail, set an address of the service providing system as a return destination of the electronic mail to which the identification information is added, and transmit the electronic mail in which the address is set, a monitoring part configured to detect reception of the electronic mail returned in response to failure of the transmission of the electronic mail, and to identify the request from the electronic apparatus based on the identification information added to the returned electronic mail, and a reporting part configured to report the failure as a process result of the request to the process reception part. The process reception part is configured to record the failure as the process result of the request in response to the reported failure.

According to an aspect of the present invention, a process result recording method executed by an information processing system including an electronic apparatus and a service providing system executing a process using electronic mail based on a request from the electronic apparatus includes receiving the request from the electronic apparatus by a process reception part, adding identification information uniquely identifying the request from the electronic apparatus to the electronic mail, setting an address of the service providing system as a return destination of the electronic mail to which the identification information is added, and transmitting the electronic mail in which the address is set, detecting reception of the electronic mail returned in response to failure of the transmission of the electronic mail, and identifying the request from the electronic apparatus based on the identification information added to the returned electronic mail, and reporting the failure as a process result of the request to the process reception part. The failure is recorded as the process result of the request in response to the reported failure by the process reception part.

The object and advantages of the present invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 5 is a diagram illustrating a configuration of a job log table;

FIGS. 6A, 6B, 6C and 6D are diagrams illustrating configurations of tables managed by a scan settings management and storage part;

FIGS. 7A, 7B and 7C are diagrams illustrating configurations of tables managed by a company management and storage part;

FIG. 8 is a diagram illustrating a job information management table;

FIG. 9 is a sequence diagram illustrating an overall process;

FIG. 11 is a schematic diagram illustrating a profile setting screen;

FIG. 12 is a schematic diagram illustrating a group setting screen;

FIG. 13 is a schematic diagram illustrating a project setting screen;

FIG. 14 is a schematic diagram illustrating a profile assignment screen;

FIG. 20 is a schematic diagram illustrating a job log check screen;

FIG. 21 is a schematic diagram illustrating another job log check screen;

FIG. 22 is a diagram illustrating a configuration of job information;

FIG. 23 is a diagram illustrating a function in a job;

FIG. 24 is a diagram illustrating parameters of e-mail transmission; and

FIG. 25 is a diagram illustrating e-mail text.

DETAILED DESCRIPTION OF THE PREFERRED EMBODIMENTS

The above-described e-mail transmitting function to transmit scanned image data as an attachment of e-mail may be provided as such a function (service) of a Web application or a server-side application as typified by a cloud service.

For example, an application for transmitting image data scanned in an image forming apparatus to a destination as an attachment of e-mail transmits e-mail to which image data are attached using a mail server. Furthermore, the application may be required to record the result (success or failure [error]) of transmission of e-mail to which image data are attached.

When the transmitted e-mail is not delivered to the destination because of, for example, a wrong destination address, however, the application may not be able to detect the transmission (delivery) error. For example, in the case where a return address (a return path) is set in e-mail to which image data are attached, an error message that is transmitted because of a wrong destination is transferred to the return address, so that the application cannot detect the transmission error of the e-mail. Accordingly, there is a problem in that the application cannot record a correct transmission result of e-mail to which image data are attached.

According to an aspect of the present invention, an information processing system, a service providing system, and a process result recording method are provided that are capable of recording a correct process result of a process that uses e-mail transmission.

A description is given below, with reference to the accompanying drawings, of embodiments of the present invention.

Figure 1:
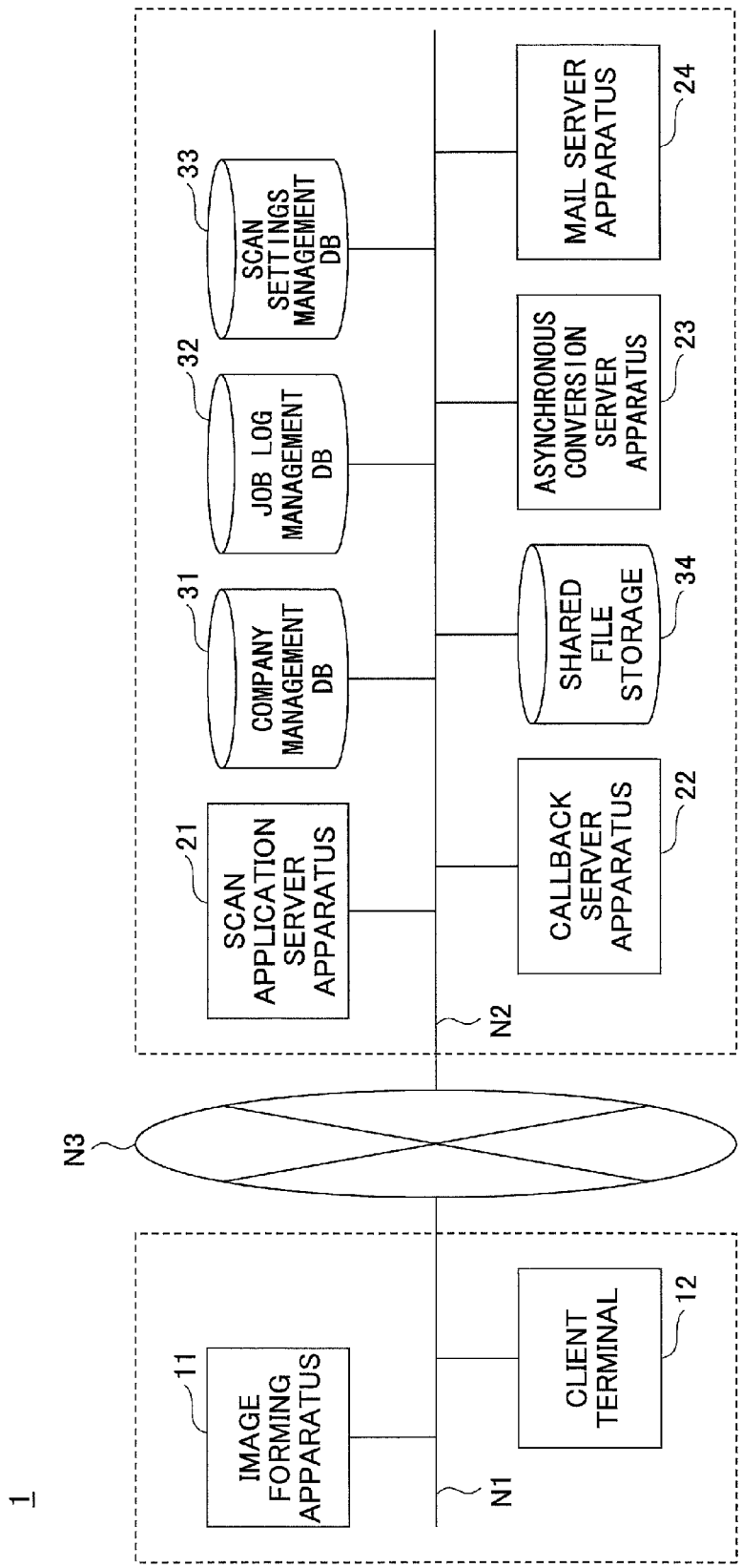
FIG. 1 is a diagram illustrating a configuration of an information processing system according to an embodiment.

FIG. 1 is a diagram illustrating a configuration of an information processing system according to an embodiment. Referring to FIG. 1, an information processing system 1 includes, for example, a network N1 of a user environment, a network N2 of a service providing system that provides services typified by cloud services, and a network N3 such as the Internet.

The network N1 includes one or more image forming apparatuses 11 (hereinafter collectively referred to as "image forming apparatus 11") and a client terminal 12. An apparatus that detects and blocks unauthorized access, such as a firewall, may be provided between the network N1 and the network N3.

The image forming apparatus 11 is an apparatus (electronic apparatus) that includes an image forming function, such as a multifunction peripheral. The image forming apparatus 11 includes a communication part that performs wired or wireless communications. The image forming apparatus 11 is also an apparatus that executes scanning (reading) an original material, such as a multifunction peripheral or a scanner.

The client terminal 12 may be implemented by, for example, an information processing apparatus including a common operating system (OS). The client terminal 12 includes a communication part that performs wired or wireless communications. The client terminal 12 is a terminal operable by a user, such as a tablet personal computer (PC), a notebook PC, a smartphone, or a cellular phone.

The network N2 includes a scan application server apparatus 21, a callback server apparatus 22, an asynchronous conversion server apparatus 23, a mail server apparatus 24, a company management database (DB) 31, a job log management DB 32, a scan settings management DB 33, and a shared file storage 34. An apparatus that detects and blocks unauthorized access, such as an access controller, may be provided between the network N2 and the network N3.

The scan application server apparatus 21 communicates with the image forming apparatus 11 and the client terminal 12 via a Web application programming interface (API). The scan application server apparatus 21 requests the asynchronous conversion server apparatus 23 to execute a process in accordance with the contents of a job.

The callback server apparatus 22 monitors the mail server apparatus 24, and detects reception of an error e-mail message. The callback server apparatus 22 identifies a job correlated with the error e-mail message whose reception the callback server apparatus 22 has detected, and reports a result to (calls back) the scan application server apparatus 21 that has requested the job. The error e-mail message is an example of an e-mail message that is returned in response to the failure of e-mail transmission.

The asynchronous conversion server apparatus 23 asynchronously performs conversion or e-mail transmission requested by the scan application server 21 or the like. The mail server apparatus 24 executes processes such as transmission of e-mail requested by the asynchronous conversion server apparatus 23 to a destination and reception of an error e-mail message. In addition to e-mail, the mail server apparatus 24 may transmit and receive Webmail.

The company management DB 31 manages information on companies and users that use the service providing system. The job log management DB 32 manages the logs of jobs executed by users. The scan settings management DB 33 manages settings for performing scanning and e-mail transmission in the image forming apparatus 11. The shared file storage 34 is a storage for storing files (such as the files of scanned images and text files after optical character recognition [OCR]) used in the service providing system.

The scan application server apparatus 21, the callback server apparatus 22, the asynchronous conversion server apparatus 23, and the mail server apparatus 24 are implemented by one or more information processing apparatuses. The scan application server apparatus 21, the callback server apparatus 22, the asynchronous conversion server apparatus 23, and the mail server apparatus 24 may be implemented by being integrated into a single information processing apparatus or by being divided into multiple information processing apparatuses.

Likewise, the company management DB 31, the job log management DB 32, the scan settings management DB 33, and the shared file storage 34 are implemented by one or more information processing apparatuses. The company management DB 31, the job log management DB 32, the scan settings management DB 33, and the shared file storage 34 may be implemented by being integrated into a single information processing apparatus or by being divided into multiple information processing apparatuses.

One or more of server apparatuses and databases included in the service providing system may be external to the network N2. Furthermore, databases included in the service providing system may be apparatuses for storing files provided by vendors, such as online storages. The configuration of the service providing system as illustrated in FIG. 1 is an example, and the service providing system may have another configuration.

Figure 2:
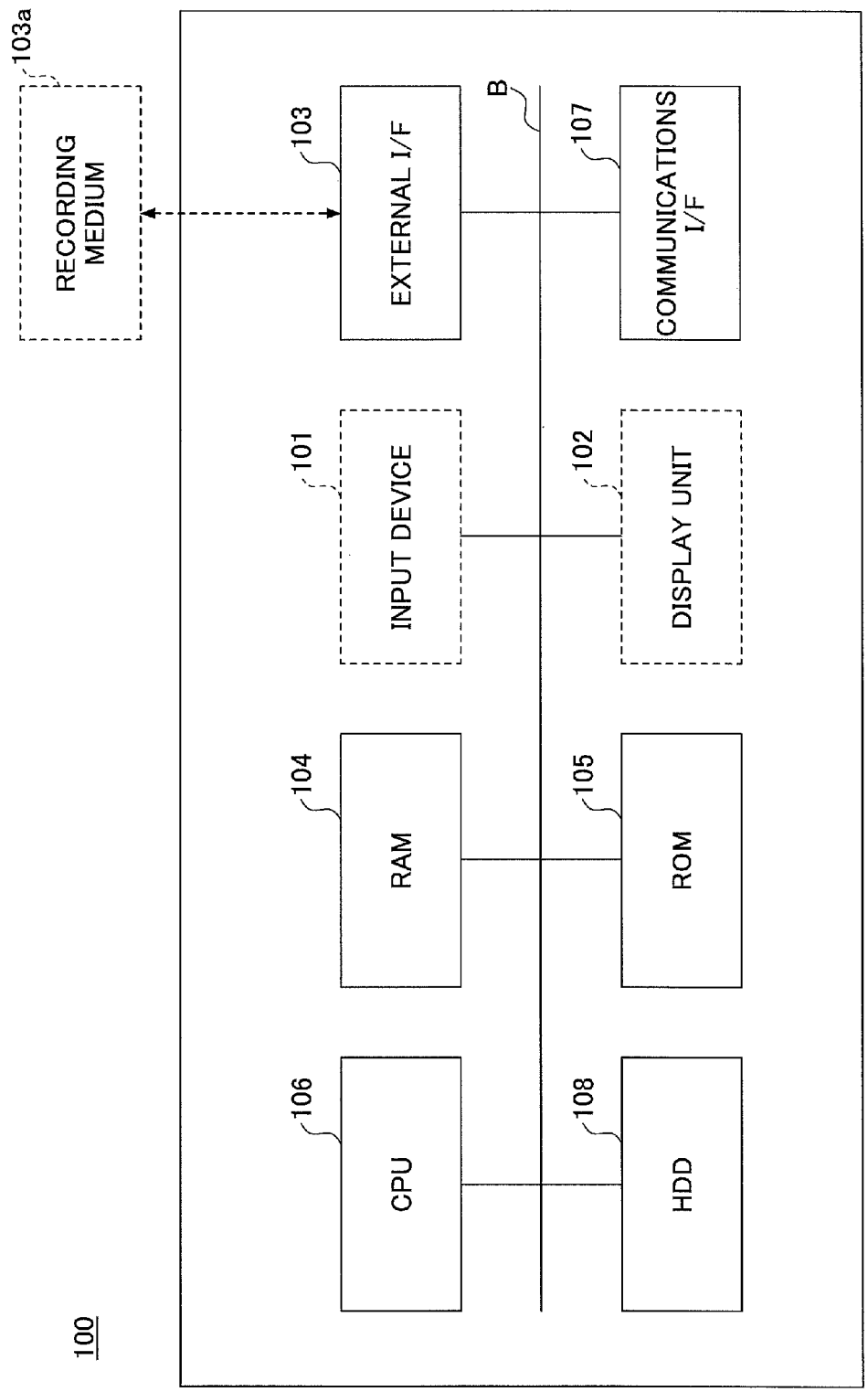
FIG. 2 is a block diagram illustrating a hardware configuration of a computer according to an embodiment.

Each of the client terminal 12, the scan application server apparatus 21, the callback server apparatus, 22, the asynchronous conversion server apparatus 23, and the mail server apparatus 24 may be implemented by, for example, a computer having a hardware configuration as illustrated in FIG. 2. Furthermore, each of the company management DB 31, the job log management DB 32, the scan settings management DB 33, and the shared file storage 34 may be implemented by, for example, a computer having a hardware configuration as illustrated in FIG. 2.

FIG. 2 is a block diagram illustrating a hardware configuration of a computer according to an embodiment. Referring to FIG. 2, a computer 100 includes an input device 101, a display unit 102, an external interface (I/F) 103, a random access memory (RAM) 104, a read-only memory (ROM) 105, a central processing unit (CPU) 106, a communications I/F 107, and a hard disk drive (HDD) 108, all of which are interconnected by a bus B. The form of use of the input device 101 and the display unit 102 may be such that the input device 101 and the display unit 102 are connected when needed.

The input device 101 includes a keyboard, a mouse, and a touchscreen, and is used to input operation signals by a user. The display unit 102 includes a display and displays the result of processing by the computer 100.

The communications I/F 107 is an interface that connects the computer 100 to the network N1 or N2. Thus, it is possible for the computer 100 to perform data communications via the communications I/F 107.

The HDD 108 is a nonvolatile storage device that contains programs and data. Examples of the stored programs and data include an OS that is a basic program that controls the computer 100 and application software that provides various functions on the OS. The HDD 108 manages the contained programs and data with a predetermined file system and/or database.

The external I/F 103 is an interface with external devices. Examples of external devices include a recording medium 103a. Thus, it is possible for the computer 100 to read and/or write to the recording medium 103a via the external I/F 103. Examples of the recording medium 103a includes a flexible disk, a compact disk (CD), a digital versatile disk (DVD), a secure digital (SD) memory card, and a universal serial bus (USB) memory.

The ROM 105 is a nonvolatile semiconductor memory (storage device) that can retain programs and data when not powered. The ROM 105 contains programs and data such as a basic input/output system (BIOS), OS settings, and network settings that are executed at the time of activation of the computer 100. The RAM 104 is a volatile semiconductor memory (storage device) that temporarily retains programs and data.

The CPU 106 is a processor that controls and implements functions of the computer 100 by reading programs and data from storage devices such as the ROM 105 and the HDD 108 into the RAM 104 and executing processes.

It is possible for the client terminal 12, the scan application server apparatus 21, the callback server apparatus, 22, the asynchronous conversion server apparatus 23, and the mail server apparatus 24 of FIG. 1 to implement the various processes as described below with the hardware configuration of the computer 100 illustrated in FIG. 2, for example.

Figure 3:
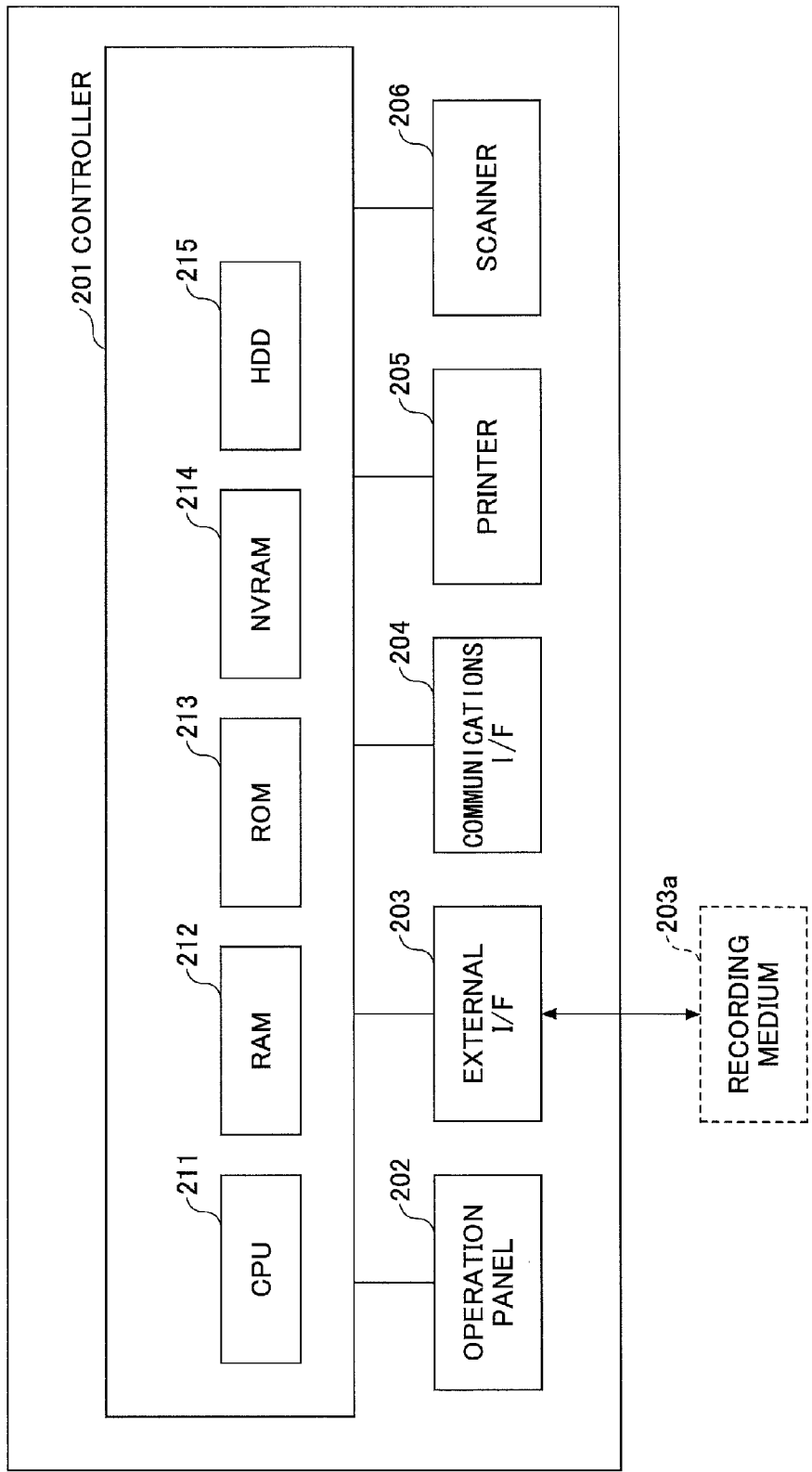
FIG. 3 is a block diagram illustrating a hardware configuration of an image forming apparatus according to an embodiment.

The image forming apparatus 11 of FIG. 1 is implemented by, for example, a computer having a hardware configuration as illustrated in FIG. 3. FIG. 3 is a block diagram illustrating a hardware configuration of an image forming apparatus according to an embodiment. The image forming apparatus 11 illustrated in FIG. 3 includes a controller 201, an operation panel 202, an external I/F 203, a communications I/F 204, a printer 205, and a scanner 206.

The controller 201 includes a CPU 211, a ROM 213, a nonvolatile (NV) RAM 214, and an HDD 215. The ROM 213 contains various programs and data. The RAM 212 temporarily retains programs and data. The NVRAM 214 contains, for example, settings information. The HDD 215 contains various programs and data.

The CPU 211 controls and implements functions of the image forming apparatus 11 by reading programs, data, and settings information from the ROM 213, the NVRAM 214, and the HDD 215 into the RAM 212 and executing processes.

The operation panel 202 includes an input part that receives a user's inputs and a display part that displays information. The external I/F 203 is an interface with external devices. Examples of external devices include a recording medium 203a. Thus, it is possible for the image forming apparatus 11 to read and/or write to the recording medium 203a via the external I/F 203. Examples of the recording medium 203a includes an integrated circuit (IC) card, a flexible disk, a CD, a DVD, an SD memory card, and a USB memory.

The communications I/F 204 is an interface that connects the image forming apparatus 11 to the network N1. Thus, it is possible for the image forming apparatus 11 to perform data communications via the communications I/F 204. The printer 205 is a printing device for printing print data on a recording medium such as paper. The scanner 206 is a reading device for reading image data (electronic data) from an original material such as a document.

Figure 4:
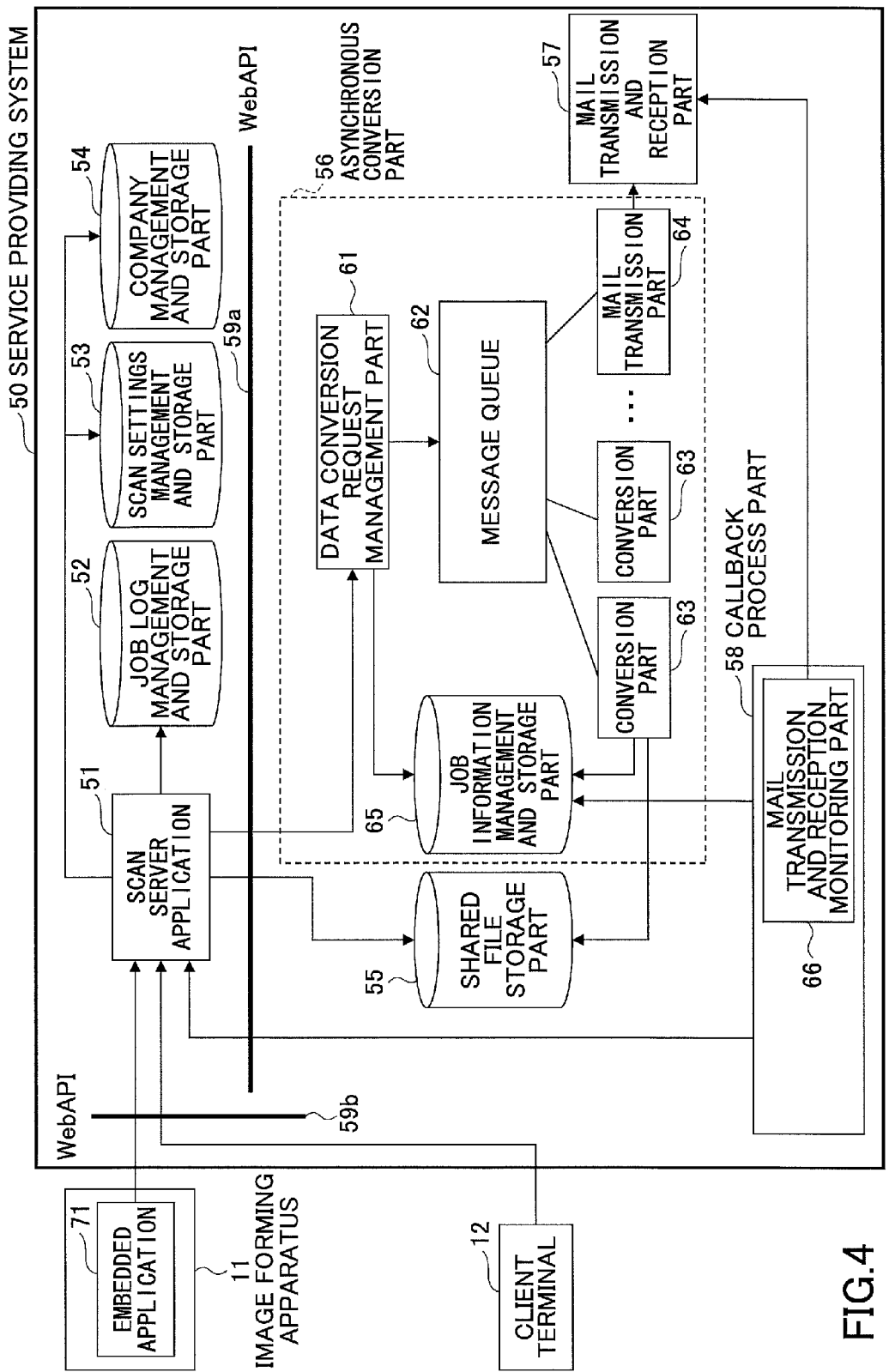
FIG. 4 is a diagram illustrating process blocks of a service providing system according to an embodiment.

A service providing system according to an embodiment is implemented by, for example, process blocks including modules and storage devices as illustrated in FIG. 4. FIG. 4 is a diagram illustrating process blocks of a service providing system according to an embodiment.

Referring to FIG. 4, a service providing system 50 implements a scan server application 51, an asynchronous conversion part 56, a mail transmission and reception part 57, a callback process part 58, and Web APIs 59*a* and 59*b* by executing one or more programs.

Furthermore, the service providing system 50 implements a job log management and storage part 52, a scan settings management and storage part 53, a company management and storage part 54, and a shared file storage part 55.

The asynchronous conversion part 56 includes a data conversion request management part 61, a message queue 62, one or more conversion parts 63 (hereinafter collectively referred to as "conversion part 63"), a mail transmission part 64, and a job information management and storage part 65. The callback process part 58 includes a mail transmission and reception monitoring part 66. The message queue 62 may include one or more message queues for individual tasks.

The scan server application 51 communicating with an embedded application 71 of the image forming apparatus 11 via the Web API 59*b* so as to connect modules. The embedded application 71 of the image forming apparatus 11 communicates with the scan server application 51 so as to obtain scan settings and register jobs. The scan server application 51 requests, for example, the asynchronous conversion part 56 to execute a process in accordance with the contents of a job.

The job log management part 52 is a storage part that manages the logs of jobs executed by users. The job log management part 52 is used when a manager or a user refers to the history of the results of executing (processing) jobs.

The scan settings management and storage part 53 is a storage part that manages settings for performing scanning and e-mail transmission in the image forming apparatus 11. The company management and storage part 54 is a storage part that manages information on companies and users that use the service providing system 50, and provides information in response to queries from modules. The shared file storage part 55 is a storage part that stores files used in the service providing system 50.

The asynchronous conversion part 56 is a process part that asynchronously executes processes requested by the scan server application 51, etc. The data conversion request management part 61 of the asynchronous conversion part 56 transmits a request for processing to the message queue 62 in accordance with the contents of a job, such as conversion or e-mail transmission, requested by, for example, the scan server application 51. The message queue 62 stores a request for processing received from the data conversion request management part 61.

The conversion part 63 and the mail transmission part 64 monitor requests for processing stored in the message queue 62. If a request for processing to be executed by the conversion part 63 or the mail transmission part 64 is stored, the conversion part 63 or the mail transmission part 64 executes the processing. The conversion part 63 performs conversion. For example, the conversion part 63 performs OCR on a tiff file so as to generate a PDF file with text.

The mail transmission part 64 transmits e-mail. The mail transmission part 64 transmits e-mail to the mail transmission and reception part 57. The job information management and storage part 65 is a storage part that manages job information, that is, information on jobs that the asynchronous conversion part 56 is requested to execute by, for example, the scan server application 51.

The mail transmission and reception part 57 executes processes such as transmission of e-mail requested by, for example, the mail transmission part 64 to a destination and reception of an error e-mail message. The mail transmission and reception monitoring part 66 of the callback process part 58 monitors the mail transmission and reception part 57, and detects reception of an error e-mail message by the mail transmission and reception part 57. The callback process part 58 identifies a job correlated with the error e-mail message whose reception has been detected by the mail transmission and reception monitoring part 66, and reports a result to (calls back), for example, the scan server application 51 that has requested the job.

The Web APIs 59*a* and 59*b* are predefined interfaces provided to receive requests, and are constituted of, for example, functions and classes. The image forming apparatus 11 and the client terminal 12 may access the functions of the scan server application 51 made open by the Web API 59*b*. Furthermore, the scan server application 51 may access the functions of the asynchronous conversion part 56, etc., made open by the Web API 59*a*. The form of classification of process blocks of the service providing system 50 illustrated in FIG. 4 is an example, and it is not necessary for the process blocks of the service providing system 50 to be classified as illustrated in FIG. 4. The form of classification of process blocks of the service providing system 50 is not limited in particular to the classification illustrated in FIG. 4 as long as it is possible to execute processes of the service providing system 50 according to an embodiment.

FIG. 5 is a diagram illustrating a configuration of a job log table (job logs). Referring to FIG. 5, each job log has data items such as a job log ID, a date of creation, a conversion job ID, a company ID, an apparatus ID, an execution user, a project ID, an image ID, a transmission destination, a transmission source address, a return address, a transmission destination address, a file format, an error report destination, and a status.

The job log ID is information that identifies a job log. The date of creation is the date and time of creation of a job log. The conversion job ID is information that identifies job information managed by the job information management and storage part 65 of the asynchronous conversion part 56. The company ID is information that identifies an organization or group such as a company or department. The company ID is not limited by the term "company." The apparatus ID is information that identifies the image forming apparatus 11 that has registered (recorded) a job.

The execution user is information that identifies a user who has registered a job by operating the image forming apparatus 11. The project ID is information that identifies a project (described below). The image ID is information that identifies a file to be processed, such as an image file. The transmission destination indicates e-mail or server message block (SMB) as a method of file transmission.

The transmission source address is a transmission source address set in an e-mail message to be transmitted. The return address is a return address set in an e-mail message to be transmitted. The transmission destination address is a destination address set in an e-mail message to be transmitted. The file format is the file format of a file attached to an e-mail message. The error report destination is the address of a destination at which the transmission error of an e-mail message is reported to a user. The status is the result of processing of a job (such as IN PROGRESS, SUCCESS, or ERROR [FAILURE]).

FIGS. 6A, 6B, 6C and 6D are diagrams illustrating configurations of tables managed by the scan settings management and storage part 53. FIGS. 6A through 6D illustrate a profile table, a group table, a project table, and an apparatus settings table, respectively.

In the project table, a user sets the contents of executable jobs as projects from the image forming apparatus 11.

Examples of projects include the job of performing scanning and transmitting scanned image data to the e-mail addresses of a user who has executed the job and other users and the job of performing scanning and transmitting the scanning result to a local server.

The project table of FIG. 6C has data items such as a project ID, a name, a group, a transmission destination, a transmission destination address, a file format, and an error report destination. The transmission destination, the transmission destination address, the file format, and the error report destination are the same as those of the job log table of FIG. 5, and accordingly, their description is omitted.

The project ID is information that identifies a project. The name is an example of information for identifying a project by a user. The group is the group ID of a group to which a project belongs. One or more projects may belong to a group.

The group table is for setting groups. The group table of FIG. 6B has data items such as a group ID, a name, a profile, and order.

The group ID is information that identifies a group. The name is an example of information for identifying a group by a user. The profile is the profile ID of a profile to which a group belongs. The order indicates the order of display of groups in a profile. One or more groups may belong to a profile.

The profile table is for setting profiles. The profile table has data items such as a profile ID, a name, and a company ID. The profile ID is information that identifies a profile. The name is an example of information for identifying a profile by a user. The company ID is the same as that of the job log table of FIG. 5. An apparatus such as the image forming apparatus 11 may be correlated with one profile.

The apparatus settings table correlates profiles and apparatuses. The apparatus settings table has data items such as a profile ID and an apparatus ID. An apparatus such as the image forming apparatus 11 is correlated with one profile by the apparatus settings table.

FIGS. 7A, 7B and 7C are diagrams illustrating configurations of tables managed by the company management and storage part 54. FIGS. 7A through 7C illustrate a company table, a user table, and an apparatus table, respectively.

The company table has data items such as a company ID and a company name. The company name is an example of information for identifying a company by a user. The company ID is correlated with the company name by the company table.

The user table has data items such as a user ID, a company ID, a name, an e-mail address, and an authentication token. The user ID and the name are information that identifies a user. The e-mail address is the e-mail address of a user. The authentication token is an authentication token given to a user who successfully logs on. A user is correlated with a company by the user table.

The apparatus table has data items such as an apparatus ID, a company ID, and a body number. The body number is an example of unique information obtainable from an apparatus such as the image forming apparatus 11. An apparatus such as the image forming apparatus 11 is correlated with a company by the apparatus table.

FIG. 8 is a diagram illustrating a job information management table (job information). Referring to FIG. 8, the job information has data items such as a conversion job ID, a date of creation, a company ID, an execution user, a file URI (Uniform Resource Indicator), a transmission destination, a transmission source address, a transmission destination address, a return address, a Message-ID, a file format, and a status.

The date of creation is the date and time of creation of job information. The file URI is an example of information indicating a location where a file such as an image file, which is an object of processing, is stored. Furthermore, the Message-ID is an example of information for correlating an error e-mail message and job information as described below. The other data items are the same as those of the job log table of FIG. 5, and accordingly, their description is omitted.

FIG. 9 is a sequence diagram illustrating an overall process. At step S1, a manager, in advance, provides the service providing system 50 with the settings of scanning performed from the image forming apparatus 11 by each user who performs scanning. The scan settings provided by the manager are managed by the scan settings management and storage part 53. At step S2, the image forming apparatus 11, at any time such as immediately after power is turned on, synchronizes its scan settings with the scan settings managed by the scan settings management and storage part 53 of the service providing system 50.

At step S3, a user who performs scanning performs scanning in the image forming apparatus 11 using the scan settings synchronized with those managed in the service providing system 50. At step S4, the image forming apparatus 11 transmits scanned image data (a scanned image) and the scan settings used by the user to the service providing system 50, and requests the service providing system 50 to execute a process.

At step S5, the service providing system 50 executes a process such as file conversion based on the scan settings. At step S6, the service providing system 50 obtains a universally unique identifier (UUID), which is a unique identifier, and correlates the obtained UUID with the process (job) requested at step S4. The UUID is an example of identification information that can uniquely identify a requested process.

At step S7, the service providing system 50 transmits an e-mail message to the e-mail address specified as a destination based on the scan settings. To the e-mail message transmitted at step S7, a file generated by the process of step S5 is attached and the UUID obtained at step S6 is added. After completion of the transmission, at step S8, the service providing system 50 sets the process result of the job shown at the "status" of the job log table of FIG. 5 and the job information management table of FIG. 8 to SUCCESS.

When the e-mail message is not delivered to the destination because of, for example, a wrong destination address, an error e-mail message is returned, that is, the e-mail message is returned with an error message, to the service providing system 50. Here, a description is given of a process in the case where an error e-mail message is returned. At step S9, an error e-mail message is returned to the service providing system 50. The UUID added to the e-mail message at step S7 is added to the returned error e-mail message.

At step S10, the service providing system 50 identifies the process requested at step S4 by the UUID added to the returned error e-mail message. At step S11, the service providing system 50 sets the process result of the job shown at the "status" of a job log of FIG. 5 and job information of FIG. 8 corresponding to the process identified by the UUID to ERROR.

At step S12, the service providing system 50 refers to the "error report destination" of the identified job log of FIG. 5, and transmits an error e-mail message describing the details of an error to the user if the error report destination is set.

Thus, according to the process illustrated in the sequence diagram of FIG. 9, a UUID, which is a unique identifier, is added to an e-mail message transmitted by the service providing system 50, and the job and the UUID are correlated in the service providing system 50. When an error e-mail message is returned, it is possible to identify the job by the UUID added to the error e-mail message and to record error as the process result of the job.

Therefore, according to the service providing system 50 of an embodiment, it is possible to record a correct process result of a job that uses e-mail transmission, so that it is possible for a user who executes a process and a manager to recognize a correct process result. Furthermore, according to the service providing system 50 of an embodiment, because it is possible to record a correct process result of a job that uses e-mail transmission, it is also possible to report error to a user who executes a process and a manager, using e-mail.

Figure 10:
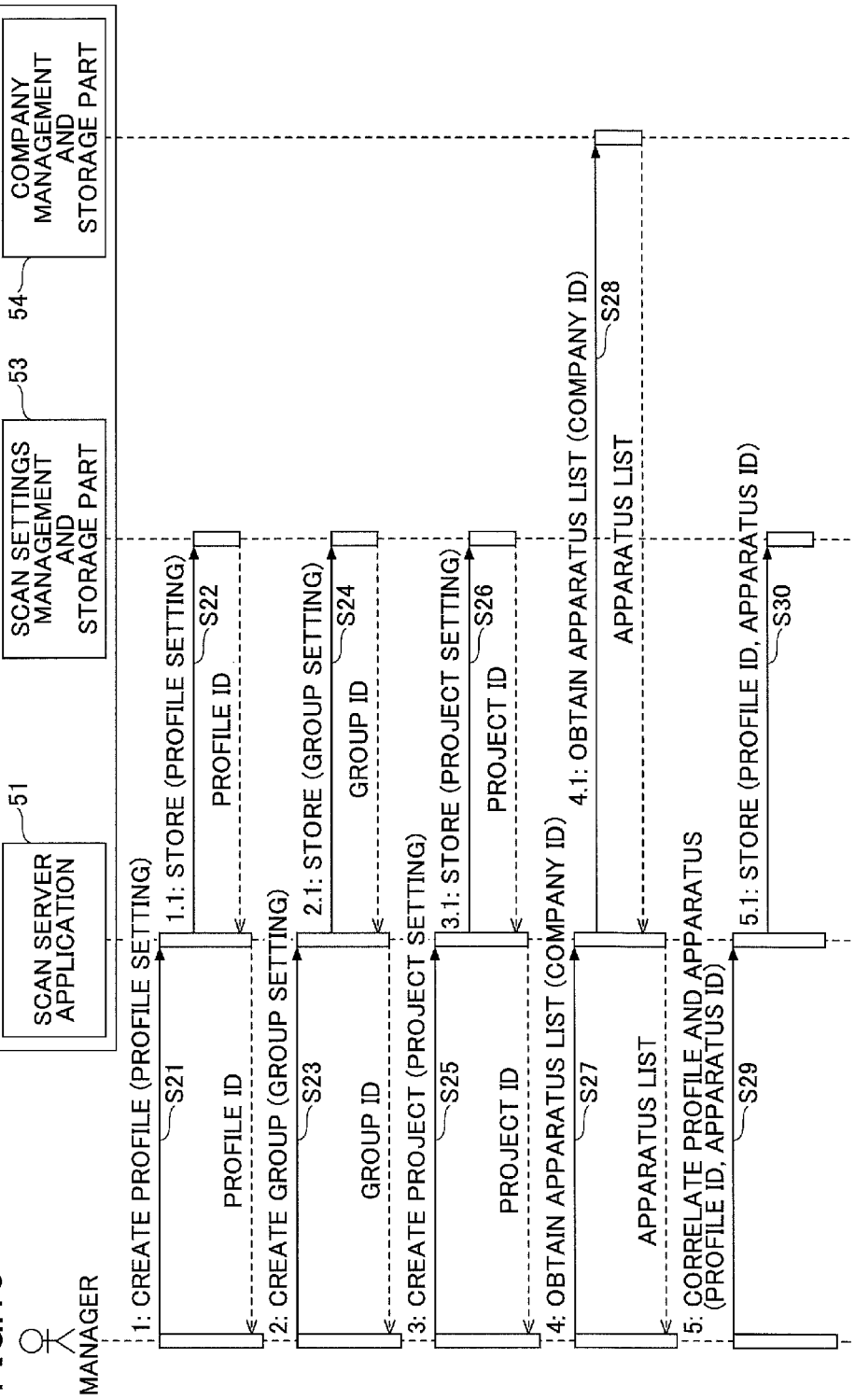
FIG. 10 is a sequence diagram illustrating a scan setting process.

By way of example, the process of providing scan settings (scan setting process) at step S1 of FIG. 9 is executed as illustrated in FIG. 10. FIG. 10 is a sequence diagram illustrating a scan setting process. FIG. 10 illustrates a case where a manager operates a browser to execute a scan setting process.

As a result of executing the scan setting process of FIG. 10, values are stored in the profile table, the group table, the project table, and the apparatus settings table of the scan settings management and storage part 53 illustrated in FIGS. 6A through 6D.

At step S21, a manager requests creation of a profile from a profile setting screen illustrated in FIG. 11. FIG. 11 is a schematic diagram illustrating a profile setting screen. The manager may determine the name of a profile and whether to perform user authentication and request the scan server application 51 to create a profile from the profile setting screen. The user authentication set from the profile setting screen is user authentication at the time of using the profile in the image forming apparatus 11.

At step S22, the scan server application 51 requests the scan settings management and storage part 53 to store the contents of the profile whose creation has been requested by the manager in the profile table (FIG. 6A). The scan settings management and storage part 53 obtains a profile ID, and stores the contents of the profile in correlation with the profile ID in the profile table. The scan settings management and storage part 53 returns the obtained profile ID to the scan server application 51 so as to report the profile ID to the manager.

At step S23, the manager requests creation of a group belonging to the profile of the reported profile ID from a group setting screen illustrated in FIG. 12. FIG. 12 is a schematic diagram illustrating a group setting screen. The manager may determine the name of a group and request the scan server application 51 to create a group belonging to the profile from the group setting screen.

Furthermore, at step S24, the scan server application 51 requests the scan settings management and storage part 53 to store the contents of the group whose creation has been requested by the manager in the group table (FIG. 6B). The scan settings management and storage part 53 obtains a group ID, and stores the contents of the group (including the profile to which the group belongs) in correlation with the group ID in the group table. The scan settings management and storage part 53 returns the obtained group ID to the scan server application 51 so as to report the group ID to the manager.

At step S25, the manager requests creation of a project belonging to the group of the reported group ID from a project setting screen illustrated in FIG. 13. FIG. 13 is a schematic diagram illustrating a project setting screen. The manager may determine the name of a project, a group to which a project belongs, a delivery destination, a transmission source address, a destination address, an error report destination, and a file format, and request the scan server application 51 to create a project from the project setting screen.

At step S26, the scan server application 51 requests the scan settings management and storage part 53 to store the contents of the project whose creation has been requested by the manager in the project table (FIG. 6C). The scan settings management and storage part 53 obtains a project ID, and stores the contents of the project in correlation with the project ID in the project table. The scan settings management and storage part 53 returns the obtained project ID to the scan application server 51 so as to report the project ID to the manager.

At step S27, the manager requests obtaining of a list of apparatuses correlated with the company ID, which list is used to display a profile assignment screen for assigning profiles to apparatuses such as the image forming apparatus 11. At step S28, the scan server application 51 obtains the requested list of apparatuses correlated with the company ID from the apparatus table (FIG. 7C) of the company management and storage part 54. The scan server application 51 receives the assignment of profile IDs to apparatus IDs from the manager by displaying a profile assignment screen including the obtained apparatus list as illustrated in FIG. 14.

FIG. 14 is a schematic diagram illustrating a profile assignment screen. The manager may correlate apparatuses such as the image forming apparatus 11 and profiles using the profile assignment screen. At step S29, the manager requests the scan server application 51 to correlate apparatus IDs and profile IDs from the file assignment screen.

At step S30, the scan server application 51 requests the scan settings management and storage part 53 to store the apparatus IDs and profile IDs requested to be correlated by the manager in the apparatus settings table (FIG. 6D). The scan settings management and storage part 53 stores the apparatus IDs and profile IDs requested to be stored by the manager in correlation with each other in the apparatus settings table of the scan settings management and storage part 53.

Thus, according to the service providing system 50 of this embodiment, it is possible to store values in the profile table, the group table, the project table, and the apparatus settings table of the scan settings management and storage part 53 of FIGS. 6A through 6D by the scan setting process.

Figure 15:
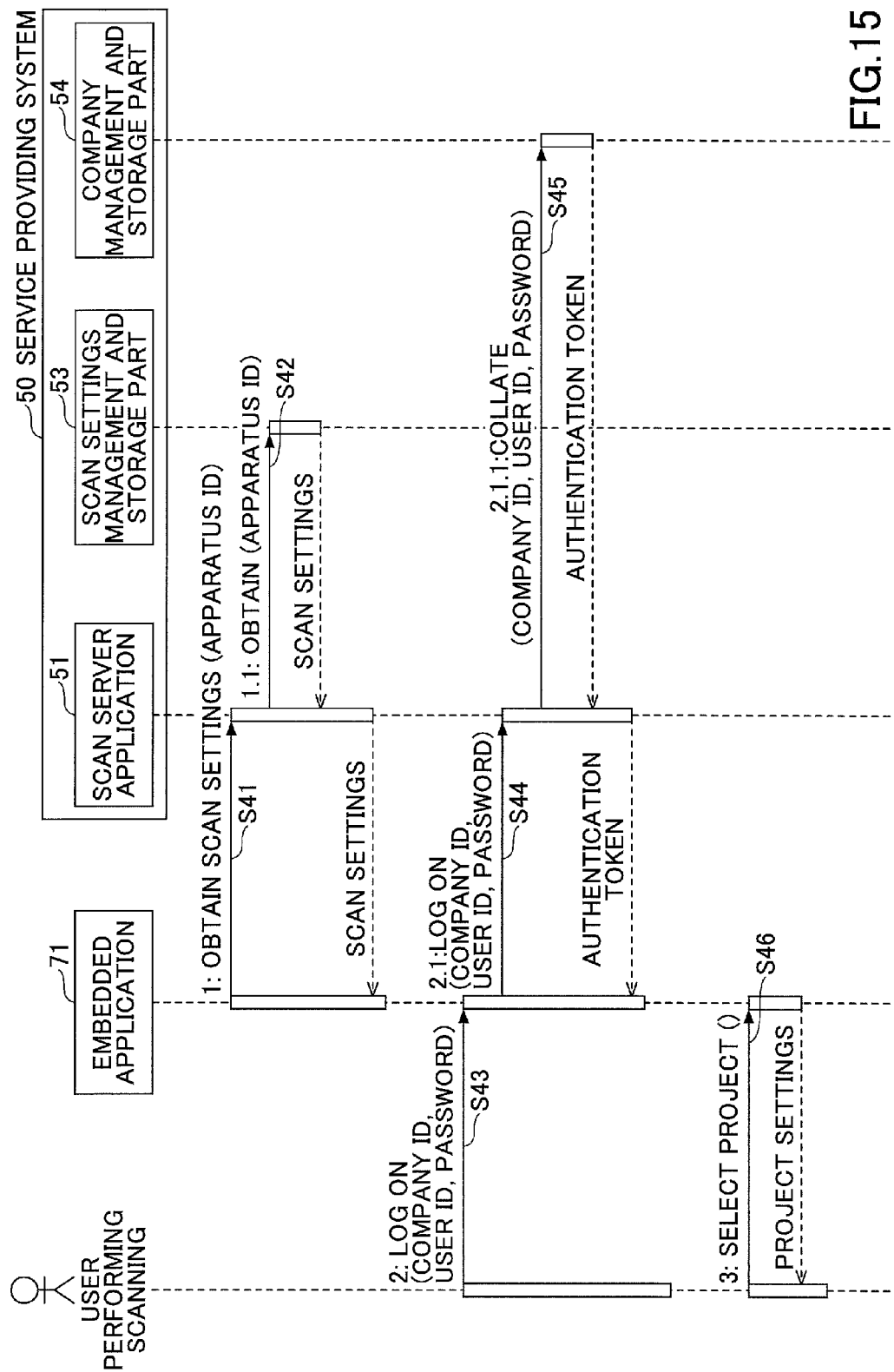
FIG. 15 is a sequence diagram illustrating a process up to the start of scanning.

For example, a process as illustrated in FIG. 15 is executed before performing scanning in the image forming apparatus 11. FIG. 15 is a sequence diagram illustrating a process up to the start of scanning. At step S41, the embedded application 71 of the image forming apparatus 11 specifies an apparatus ID and requests the scan server application 51 of the service providing system 50 to obtain scan settings.

At step S42, the scan server application 51 obtains the scan settings correlated with the apparatus ID from the scan settings management and storage part 53, and provides the embedded application 71 of the image forming apparatus 11 with the obtained scan settings. Thus, the image forming apparatus 11 synchronizes with the scan settings stored in the service providing system 50 by obtaining the scan settings from the service providing system 50 by, for example, polling.

Thereafter, a user who performs scanning, who is an example of an execution user (a user who executes a process), uses the image forming apparatus 11 at any time. At step S43, the user makes a request for a logon with authentication information such as a company ID, a user ID, and a password to the embedded application 71. At step S44, the embedded application 71 makes a request for a logon to the scan server application 51 of the service providing system 50.

At step S45, the scan server application 51 requests the company management and storage part 54 to collate the authentication information used for a logon. If user information that matches the authentication information used for a logon is stored, the company management and storage part 54 transmits an authentication token correlated with the user information to the scan server application 51. The scan server application 51 transmits the received authentication token to the embedded application 71 of the image forming apparatus 11.

At step S46, the user operates the embedded application 71 to select a project corresponding to the contents of a job desired to be executed. It is possible for the user to check the settings of the selected project.

Figure 16:
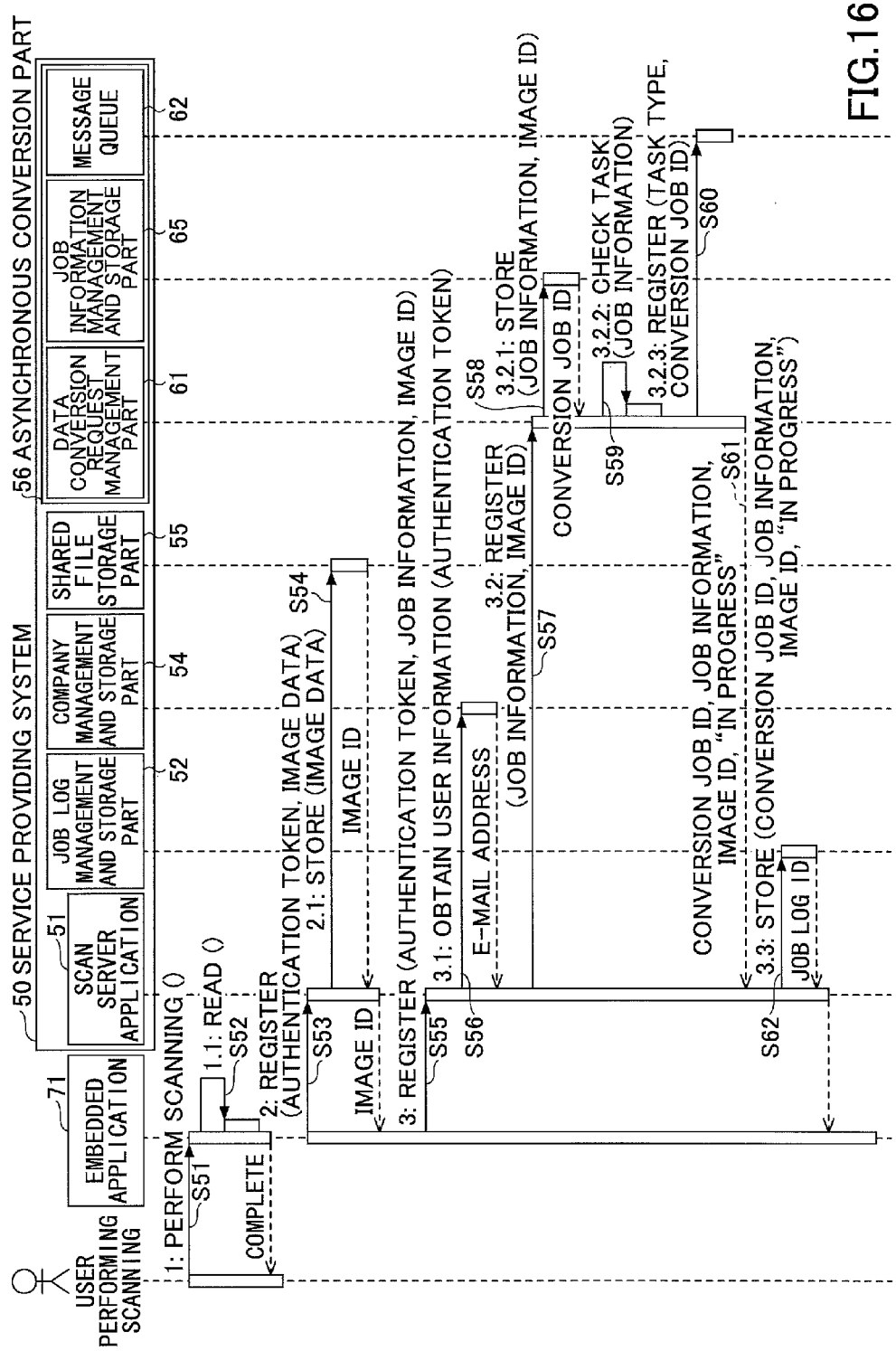
FIG. 16 is a sequence diagram illustrating a process for registering a job with the service providing system.

By way of example, a process as illustrated in FIG. 16 is executed before registration of a job with the service providing system 50 after performing scanning. FIG. 16 is a sequence diagram illustrating a process for registering a job with the service providing system 50.

At step S51, a user who performs scanning requests the embedded application 71 of the image forming apparatus 11 to perform scanning. At step S52, the embedded application 71 scans an original material based on the settings of a project selected by the user, and obtains image data. Thereafter, the embedded application 71 reports completion of the scanning to the user.

At step S53, the embedded application 71 transmits an authentication token and the image data to the scan server application 51 of the service providing system 50, and requests the scan server application 51 to register the image data. At step S54, the scan server application 51 requests the shared file storage part 55 to store the image data. The shared file storage part 55 stores the image data, and assigns an image ID to the image data. The shared file storage part 55 reports the image ID of the stored image data to the scan server application 51. Furthermore, the scan server application 51 reports the image ID of the image data stored in the shared file storage part 55 to the embedded application 71.

At step S55, the embedded application 71 transmits the authentication token, job information corresponding to the settings of the project selected by the user, and the reported image ID to the scan server application 51 of the service providing system 50, and requests the scan server application 51 to register the job information and the image ID. At step S56, the scan server application 51 obtains the e-mail address of the user from the company management and storage part 54 using the received authentication token. The scan server application 51 updates the e-mail setting of the job information by the obtained e-mail address.

If, for example, <me> is set in the transmission destination address of the job information, the scan server application 51 replaces the transmission destination address with the obtained e-mail address. The scan server application 51 specifies the e-mail address of the service providing system 50 in the return address in order to detect an e-mail message that results in error in the scan server application 51.

At step S57, the scan server application 51 transmits the job information and the image ID to the data conversion request management part 61 of the asynchronous conversion part 56, and requests the data conversion request management part 61 to register the job information and the image ID. At step S58, the data conversion request management part 61 transmits the job information and the image ID to the job information management and storage part 65, and requests the job information management and storage part 65 to store the job information and the image ID. The job information management and storage part stores the job information and the image ID, and assigns a conversion job ID to the stored job information and image ID. The job information management and storage part 65 reports the assigned conversion job ID to the data conversion request management part 61. Furthermore, at step S59, the data conversion request management part 61 determines a task from the job information, and at step S60, the data conversion request management part 61 registers a message (request) in which the task type of the task and the conversion job ID are specified with the message queue 62.

For example, if the task determined from the job information includes conversion of a file format, a file format is converted before transmission of e-mail. Therefore, a keyword that indicates conversion of a file format is specified in the task type before the message is stored in the message queue 62.

Examples of conversion of a file format executed before transmission of e-mail include conversion of a TIFF file into a PDF with text or an application file. Furthermore, examples of keywords indicating conversion of a file format specified in the task type include "img2pdf".

At step S61, in response to the registration request of step S57, the data conversion request management part 61 returns the conversion job ID, the job information, the image ID, and the status of "IN PROGRESS" to the scan server application 51. At step S62, the scan server application 51 causes the job log management and storage part 52 to store the conversion job ID, the job information, the image ID, and the status of "IN PROGRESS" returned from the asynchronous conversion part 56 as a job log. The job log management and storage part 52 assigns a job log ID to the job log, and reports the job log ID to the embedded application 71 of the image forming apparatus 11 through the scan server application 51.

The process of registering (recording) image data at step S53 and the process of registering (recording) job information at step S55, which are separated in FIG. 16, may alternatively be integrated into a single process. In FIG. 16, the process of step S53 and the process of step S55 are separated in view of local delivery.

Figure 17:
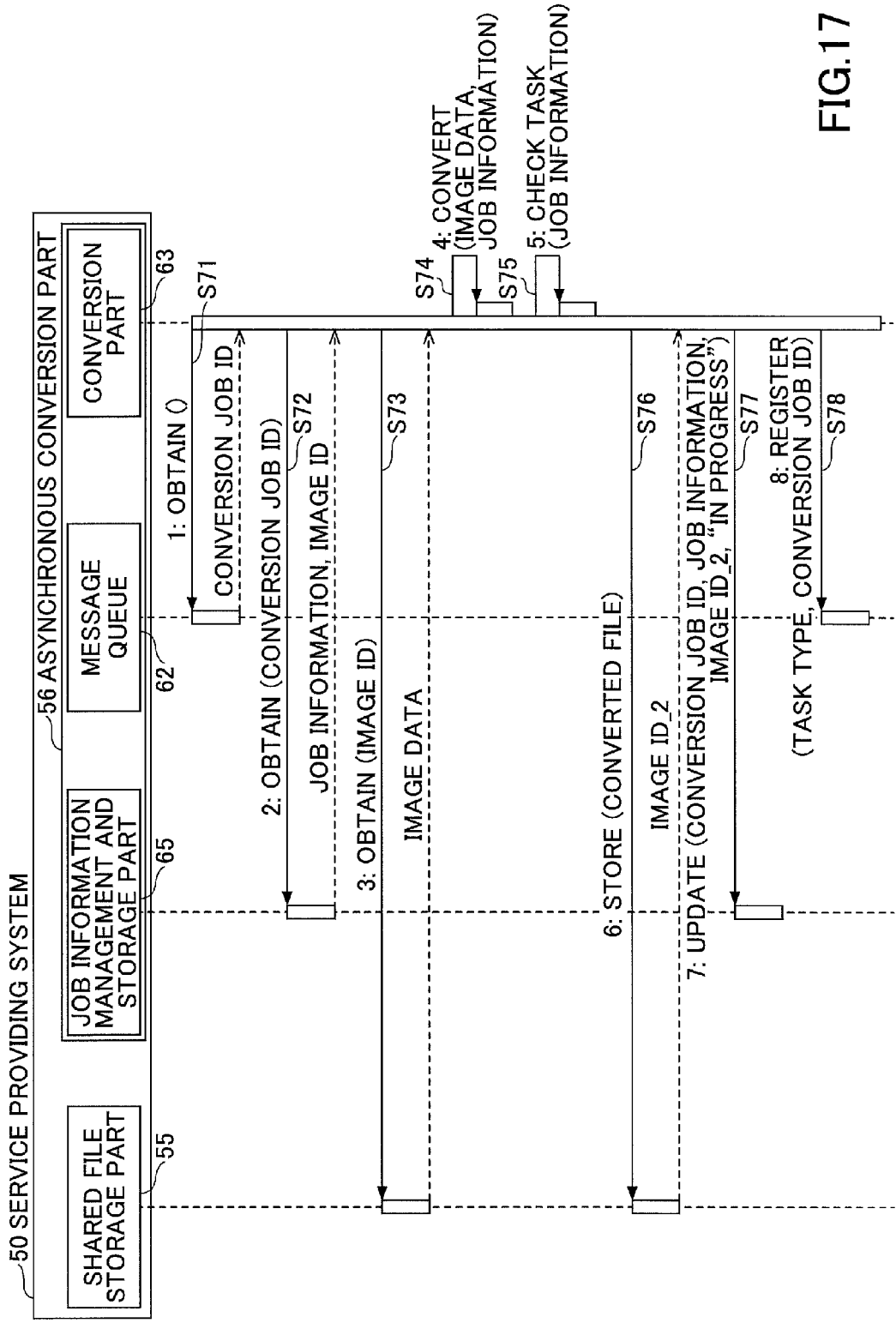
FIG. 17 is a sequence diagram illustrating a file format conversion process by an asynchronous conversion part.

A description is given of conversion of a file format by the asynchronous conversion part 56. By way of example, the asynchronous conversion part 56 executes a process as illustrated in FIG. 17. FIG. 17 is a sequence diagram illustrating a file format conversion process by the asynchronous conversion part 56. When a message is stored in a message queue 62 for file format conversion, for example, the conversion part 63 that monitors the message queue 62 executes the process of step S71.

At step S71, the conversion part 63 obtains a message in which a task type and a conversion job ID are specified from the message queue 62 that is under the monitoring of the conversion part 63. At step S72, the conversion part 63 obtains job information and an image ID from the job information management and storage part 65 by specifying the conversion job ID of the obtained message.

At step S73, the conversion part 63 obtains image data from the shared file storage part 55 by specifying the obtained image ID. At step S74, the conversion part 63 converts the file format of the obtained image data in accordance with the task type specified in the message. At step S75, the conversion part 63 determines whether there is a subsequent task by referring to the job information. Here, it is assumed that there is a subsequent task of e-mail transmission.

At step S76, the conversion part 63 requests the shared file storage part 55 to store the converted file whose file format has been converted. The shared file storage part 55 stores the converted file, and assigns an image ID_2 to the converted file. The shared file storage part 55 reports the image ID_2 of the stored converted file to the conversion part 63.

At step S77, the conversion part 63 transmits the conversion job ID, the job information, the image ID 2, and the status of "IN PROGRESS" to the job information management and storage part 65, and causes the job information management and storage part 65 to update the information stored in the job information management and storage part 65. At step S78, the conversion part 63 registers a message in which a task type of e-mail transmission and the conversion job ID are specified with the message queue 62.

Figure 18:
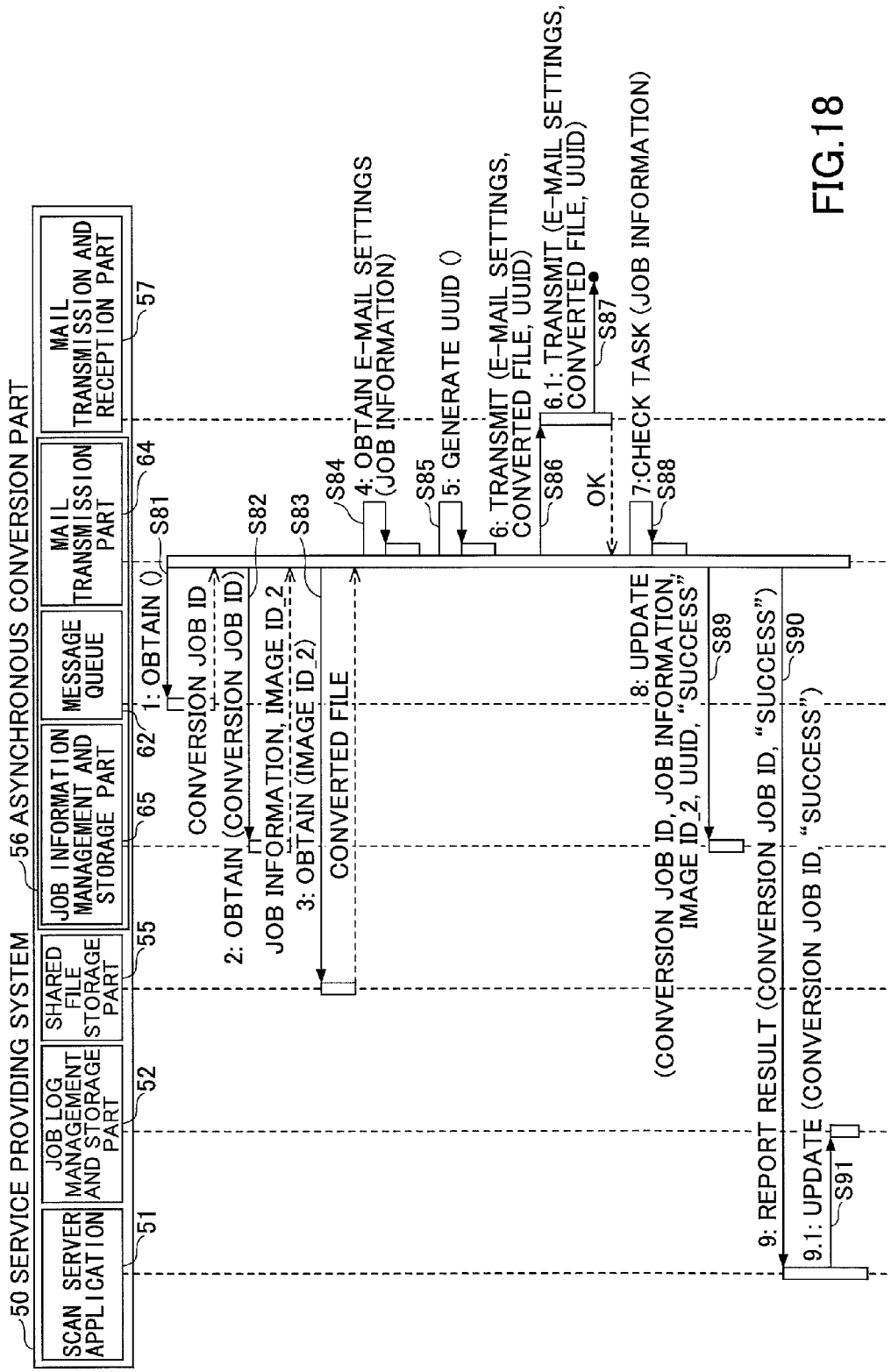
FIG. 18 is a sequence diagram illustrating an e-mail transmission process by the asynchronous conversion part.

Furthermore, by way of example, the asynchronous conversion part 56 executes a process as illustrated in FIG. 18. FIG. 18 is a sequence diagram illustrating an e-mail transmission process by the asynchronous conversion part 56. When a message is stored in a message queue 62 for e-mail transmission, for example, the mail transmission part 64 that monitors the message queue 62 executes the process of step S81.

At step S81, the mail transmission part 64 obtains a message in which a task type and a conversion job ID are specified from the message queue 62 that is under the monitoring of the mail transmission part 64. At step S82, the mail transmission part 64 obtains job information and an image ID_2 from the job information management and storage part 65 by specifying the conversion job ID specified in the obtained message.

At step S83, the mail transmission part 64 obtains a converted file from the shared file storage part 55 by specifying the obtained image ID_2. At step S84, the mail transmission part 64 reads e-mail settings such as a transmission destination address from the job information obtained from the job information management and storage part 65. At step S85, the mail transmission part 64 generates a UUID.

At step S86, the mail transmission part 64 generates an e-mail message of the e-mail settings read from the job information, and attaches the converted file to the e-mail message. Furthermore, the e-mail transmission part 64 adds the UUID to the Message-ID of the mail header. The UUID may alternatively be added to the Comment of the mail header or the text of the e-mail message.

Then, the mail transmission part 64 requests the mail transmission and reception part 57 to transmit the e-mail message. At step S87, the mail transmission and reception part 57 transmits the e-mail message whose transmission has been requested by the mail transmission part 64.

When a request to the mail transmission and reception part 57 for e-mail transmission is successfully made, at step S88, the mail transmission part 64 determines whether there is a subsequent task by referring to the job information. Here, it is assumed that there is no subsequent task. At step S89, the mail transmission part 64 transmits the conversion job ID, the job information, the image ID_2, and the status of "SUCCESS" to the job information management and storage part 65, and causes the job information management and storage part 65 to update the information stored in the job information management and storage part 65.

At step S90, the mail transmission part 64 reports the conversion job ID and the status of "SUCCESS" to the scan server application 51 as a process result. At step S91, the scan server application 51 transmits the conversion job ID and the status of "SUCCESS" to the job log management and storage part 52, and causes the job log management and storage part 52 to update the information stored in the job log management and storage part 52.

Figure 19:
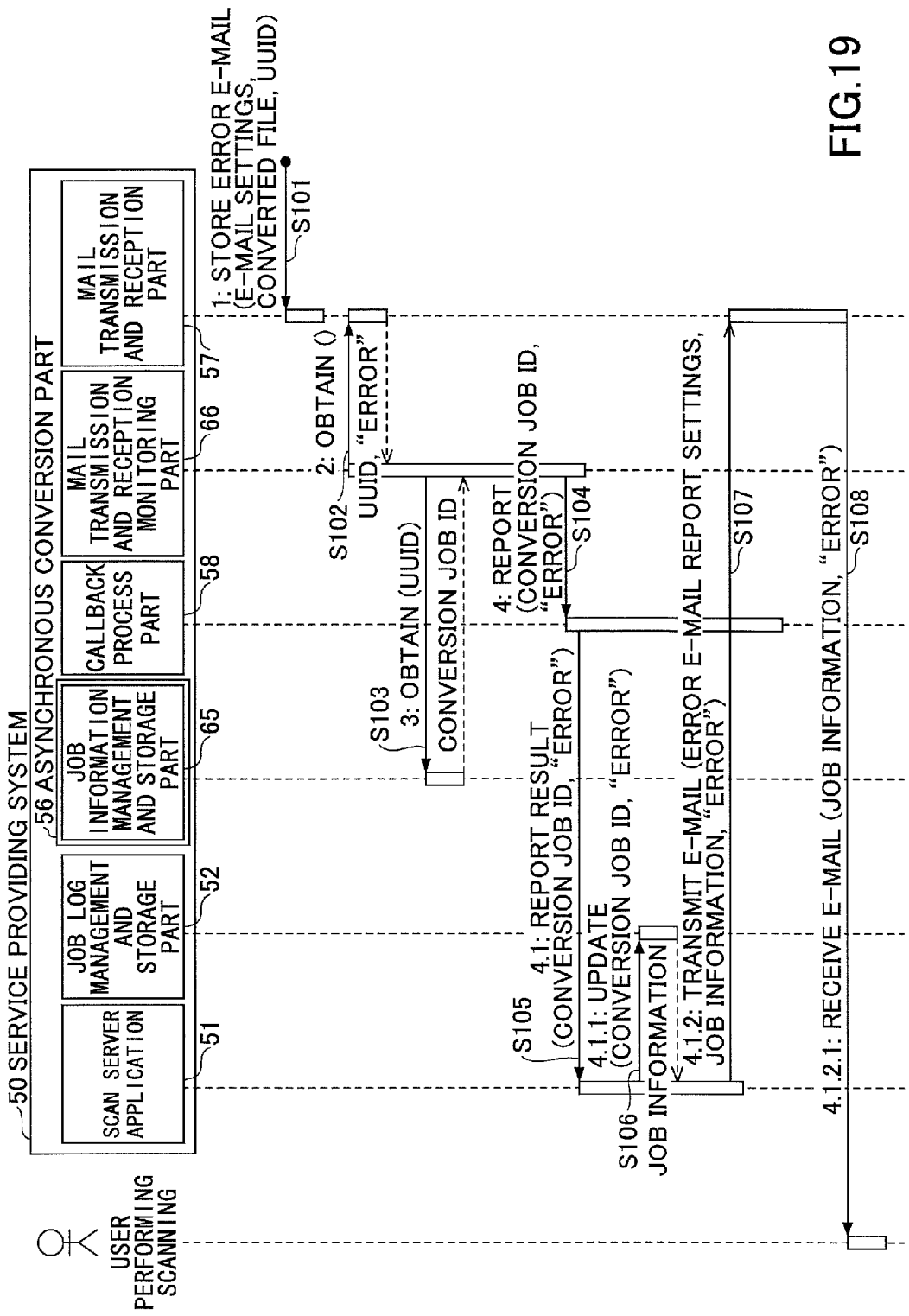
FIG. 19 is a sequence diagram illustrating a process result updating process due to detection of an error e-mail message.

When an e-mail message is not delivered to a destination because of, for example, a wrong destination address, an error e-mail message is returned. According to the service providing system 50 of this embodiment, the e-mail address of the service providing system 50 is specified in the return address of an e-mail message to be transmitted. Therefore, an error e-mail message is returned to the mail transmission and reception part 57. When an error e-mail message is returned, the service providing system 50 executes a process as illustrated in FIG. 19. FIG. 19 is a sequence diagram illustrating a process result updating process due to detection of an error e-mail message.

When an e-mail message is not delivered to a destination because of, for example, a wrong destination address, at step S101, the mail transmission and reception part 57 receives an error e-mail message, and stores the received error e-mail message. The mail transmission and reception monitoring part 66 monitors the mail transmission and reception part 57, and detects reception of an error e-mail message by the mail transmission and reception part 57.

At step S102, the mail transmission and reception monitoring part 66 obtains the UUID and the status of "ERROR" added to the error e-mail message received by the mail transmission and reception part 57 from the mail transmission and reception part 57.

At step S103, the mail transmission and reception monitoring part 66 obtains a conversion job ID correlated with the UUID (Message-ID) from the job information management and storage part 65 of the asynchronous conversion part 56 by specifying the UUID. At step S104, the mail transmission and reception monitoring part 66 reports the conversion job ID and the status of "ERROR" to the callback process part 58. At step S105, the callback process part 58 reports the conversion job ID and the status of "ERROR" to the scan server application 51 as a process result.

At step S106, the scan server application 51 transmits the conversion job ID and the status of "ERROR" to the job log management storage part 52, and causes the job log management storage part 52 to update the information stored in the job log management storage part 52. Thus, the process result of a job of a job log managed by the job log management and storage part 52 is correctly updated.

When the error report destination of the job log of FIG. 5 is determined, the scan server application 51 executes a process at and after step S107. At step S107, the scan server application 51 requests the mail transmission and reception part 57 to transmit an error e-mail message in which the details of the error are described to the error report destination. At step S108, the mail transmission and reception part 57 transmits the error e-mail message whose transmission has been requested by the scan application server 51 at step S107 to an execution user who is the error report destination. The details of a job that has resulted in error may be described in the error e-mail message transmitted to the error report destination by the scan server application 51. Therefore, it is possible to notify the execution user of the cause of the error in more detail than by error e-mail from a mailer-daemon.

When a manager or an execution user refers to job logs, the scan server application 51 may cause a job log check screen as illustrated in FIG. 20 to be displayed on the image forming apparatus 11 or the client terminal 12. FIG. 20 is a schematic diagram illustrating a job log check screen. On the job log check screen of FIG. 20, the process results (statuses) of processed jobs are shown as statuses. The "status" of the job log check screen is displayed based on the status of a job log managed by the job log management and storage part 52.

Accordingly, it is possible for a manager or an execution user who refers to job logs to refer to the correctly updated process results of jobs on the job log check screen. Furthermore, it is possible to display internal errors and external errors separately on the job log check screen by recording external errors for which error e-mail messages are returned and internal errors caused before e-mail transmission separately in the job logs managed by the job log management and storage part 52.

FIG. 21 is a schematic diagram illustrating another job log check screen. As illustrated in FIG. 21, in addition to separately displaying internal errors and external errors, the job log check screen may display the details of errors. In this case, the job log management and storage part 52 manages job logs by adding a data item of error details to the data items of the job logs.

According to the service providing system 50, a UUID is added to each e-mail message transmitted in response to execution of a job, and the UUID is stored in correlation with the job in the service providing system 50. Furthermore, the service providing system 50 records the status of the job as "SUCCESS" at the time of execution of transmission of the e-mail message.

Thereafter, when the mail transmission and reception part 57 of the service providing system 50 receives an error e-mail message due to a wrong destination address, the mail transmission and reception monitoring part 66 detects reception of the error e-mail message. It is possible for the mail transmission and reception monitoring part 66 to identify the job correlated with the UUID by obtaining the UUID from the error e-mail message.

The callback process part 58 notifies the scan server application 51 that the identified job has resulted in error, so that it is possible for the scan server application 51 to update the status of the job to "ERROR" (overwrite "ERROR" on the status of the job).

FIG. 22 is a diagram illustrating a configuration of job information. By way of example, FIG. 22 illustrates job information in JavaScript Object Notation (JSON) format. Referring to FIG. 22, "app_id" included in the data structure of the job information represents the ID of an application that is a requester of the job. Furthermore, "user id" represents the user ID of an end user who is a requester of the job, such as a user who executes scanning.

Furthermore, "organization id" is a company ID that identifies an organization or a group to which the end user who is a requester of the job belongs. Furthermore, "tasks" stores one or more tasks in an array. The data structure of "tasks" includes "type" that indicates the process type (task type) of a task and "params" that indicates the parameters of file format conversion or e-mail transmission specified by a user.

FIG. 23 is a diagram illustrating a function in a job. The "tasks" part of the job information of FIG. 22 is extracted and illustrated in FIG. 23. According to an embodiment, the service providing system 50 implements the cooperation of the conversion part 63 and the mail transmission part 64 by a function in a job.

When multiple files are specified in the "files" parameter of "mail sender", the mail transmission part 64 transmits an e-mail message by attaching the multiple files to the single e-mail message. The mail transmission part 64 uses the output data of the conversion part 63. Therefore, it is possible for the mail transmission part 64 to use a function in a job, such as "$1.file". Accordingly, it is possible for the mail transmission part 64 to use a converted file that is the process result of a preceding task.

Here, "$1.file", which is a method of description by the conversion part 63, can only support specification in string format. For example, it may be desired to specify a filename file by file in the mail transmission part 64. Therefore, in order to support format such as [{"file":"$1.file", "filename":"test1.doc"}], the mail transmission part 64 additionally includes an analysis part that supports hashes and arrays. As a result, it is possible for the asynchronous conversion part 56 to add an attribute file by file with another engine.

FIG. 24 is a diagram illustrating parameters of e-mail transmission. FIG. 24 illustrates the part of "params" indicating parameters of e-mail transmission extracted from FIG. 23. The parameters of e-mail transmission of FIG. 19 include file information and e-mail transmission settings information, and are expressed in hash format.

Referring to FIG. 24, a required parameter "from" is a transmission source address, and does not allow specification of multiple values. Although not required parameters, at least one of optional parameters "to", "cc", and "bcc", has to be set. The total number of destinations is not limited.

Furthermore, an optional parameter "files" sets information by the hash of an element attachment file by attachment file in array format. In the hash, the URI of an attachment file may be specified by a value corresponding to a "file" key. The filename (including an extension) of an attachment file to be transmitted may be specified by a value corresponding to a "filename" key (or omitted).

The default value of "filename" is a character string after the last "/" of the URL specified in "file". The maximum number of characters of the filename is 128 including an extension. The upper limit of the total size of files is, for example, 50 MB. The number of attachment files is not limited.

The optional parameter "to" is a destination e-mail address, and allows specification of multiple values in an array. The optional parameter "cc" is a cc e-mail address, and allows specification of multiple values in an array. The optional parameter "bcc" is a bcc e-mail address, and allows specification of multiple values in an array.

An optional parameter "subject" is an e-mail subject, and is, for example, fewer than or equal to 1,000 characters. An optional parameter "body" is e-mail text, and is, for example, fewer than or equal to 10,000 characters. An optional parameter "charset" specifies the character code of the e-mail subject and the e-mail text. Examples of character codes that may be specified include utf-8, us-ascii, iso-8859-1, iso-2022-jp, shift jis, and euc-jp.

The mail transmission part 64 creates, for example, e-mail text as illustrated in FIG. 25. FIG. 25 is a diagram illustrating e-mail text. The mail transmission part 64 generates e-mail text as illustrated in FIG. 25 in accordance with the multipurpose Internet mail extensions (MINE) standard from the obtained job information and attachment file. Then, the mail transmission part 64 requests the mail transmission and reception part 57 to transmit the generated e-mail text.

According to the service providing system 50, it is possible for a user who executes scanning or a manager to refer to the correctly updated process results of jobs. Furthermore, according to the service providing system 50, because it is possible to correctly update the statuses of jobs, an error e-mail message is returned to the user or manager by the error reporting function.

Thus, according to the service providing system 50, for example, the introduction of the callback process part 58 and the mail transmission and reception monitoring part 66 makes it possible to detect an error e-mail message for e-mail transmission performed asynchronously at the final step of a process. Furthermore, it is possible to identify a job correlated with the error e-mail message and report the error of the job to the scan server application 51. Accordingly, it is possible to reflect the correct process result of the job in the job log.

According to an aspect of the present invention, the scan server application 51 corresponds to a process reception part, the mail transmission part 64 corresponds to a mail transmission part, the mail transmission and reception monitoring part 66 corresponds to a monitoring part, the callback process part 58 corresponds to a reporting part, and the conversion part 63 corresponds to a conversion part.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. An information processing system, a service providing system, and a process result recording method have been described in detail based on one or more embodiments of the present invention. It should be understood, however, that the various changes, substitutions, and alterations could be made hereto without departing from the spirit and scope of the invention.

What is claimed is:

1. An information processing system including an electronic apparatus and a service providing system executing a process using electronic mail based on a request from the electronic apparatus, the information processing system comprising:
   a process reception part configured to receive the request from the electronic apparatus;
   a mail transmission part configured to add identification information uniquely identifying the request from the electronic apparatus to the electronic mail, set an address of the service providing system as a return destination of the electronic mail to which the identification information is added, and transmit the electronic mail in which the address is set;
   a monitoring part configured to detect reception of the electronic mail returned in response to failure of the transmission of the electronic mail, and to identify the request from the electronic apparatus based on the identification information added to the returned electronic mail; and
   a reporting part configured to report the failure as a process result of the request to the process reception part,
   wherein the process reception part is configured to temporarily record success as the process result of the request, and in response to the failure being reported, replace the success with the failure to record the failure as the process result of the request.

2. The information processing system as claimed claim 1, further comprising:
   a conversion part configured to convert a format of electronic data transmitted from the electronic apparatus, based on the request from the electronic apparatus,
   wherein the mail transmission part is further configured to attach the electronic data of the converted format to the electronic mail before transmitting the electronic mail.

3. The information processing system as claimed in claim 1, wherein the process reception part is configured to report the failure as the process result of the request to a report destination correlated with the request, in response to the reported failure.

4. The information processing system as claimed in claim 1, wherein the mail transmission part is configured to add the identification information to a Message-ID of a header of the electronic mail.

5. An information processing method executed by an information processing system including an electronic apparatus and a service providing system executing a process using electronic mail based on a request from the electronic apparatus, the information processing method comprising:
   receiving the request from the electronic apparatus by a process reception part;
   adding identification information uniquely identifying the request from the electronic apparatus to the electronic mail, setting an address of the service providing system as a return destination of the electronic mail to which the identification information is added, and transmitting the electronic mail in which the address is set;
   detecting reception of the electronic mail returned in response to failure of the transmission of the electronic mail, and identifying the request from the electronic apparatus based on the identification information added to the returned electronic mail; and
   reporting the failure as a process result of the request to the process reception part,
   wherein success is temporarily recorded as the process result of the request, and in response to the failure being reported, the success is replaced with the failure to record the failure as the process result of the request by the process reception part.

* * * * *